US012333767B2

(12) United States Patent
Newman

(10) Patent No.: US 12,333,767 B2
(45) Date of Patent: Jun. 17, 2025

(54) SYSTEMS, APPARATUS, AND METHODS FOR COLOR SPACE REPRESENTATION

(71) Applicant: GoPro, Inc., San Mateo, CA (US)

(72) Inventor: David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 621 days.

(21) Appl. No.: 17/647,300

(22) Filed: Jan. 6, 2022

(65) Prior Publication Data

US 2023/0215051 A1   Jul. 6, 2023

(51) Int. Cl.
*G06T 9/00* (2006.01)
*G06T 1/20* (2006.01)
*G06T 3/40* (2024.01)
*H04N 9/64* (2023.01)

(52) U.S. Cl.
CPC ............ *G06T 9/00* (2013.01); *G06T 1/20* (2013.01); *G06T 3/40* (2013.01); *H04N 9/64* (2013.01)

(58) Field of Classification Search
CPC .... G06T 9/00; G06T 1/20; G06T 3/40; G06T 2207/10024; G06T 7/90; G06T 3/20; G06T 2207/20208; H04N 9/64
See application file for complete search history.

(56) References Cited

U.S. PATENT DOCUMENTS

| | | | |
|---|---|---|---|
| 2017/0237897 A1* | 8/2017 | Sivan | G06V 40/166 |
| | | | 348/47 |
| 2017/0330529 A1* | 11/2017 | Van Mourik | H04N 19/85 |
| 2018/0160126 A1* | 6/2018 | Andersson | H04N 19/132 |
| 2018/0314932 A1* | 11/2018 | Schwartz | G06F 7/60 |
| 2023/0386384 A1* | 11/2023 | Shafer | G09G 5/02 |

* cited by examiner

*Primary Examiner* — Andrew W Bee
*Assistant Examiner* — Winta Gebreslassie
(74) *Attorney, Agent, or Firm* — Wang Hardoon, P.C.

(57) ABSTRACT

Systems, apparatus, and methods for color space representation. Unlike television and other passively viewed content, action cameras enable the user to take an active role in content generation/modification. Ideally, image content can be transferred from action cameras to post-processing devices with minimal signal loss (noise introduction), however existing device ecosystems are often bottlenecked by commodity codecs and/or intermediary networks. Various embodiments of the present disclosure use an improved "transport" compression technique to preserve desirable signal codeword and noise codeword relationships for color space representation.

7 Claims, 9 Drawing Sheets

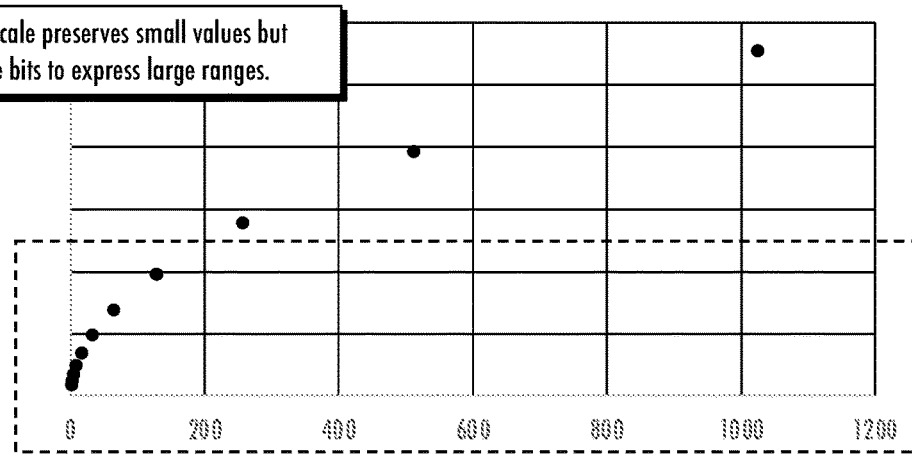
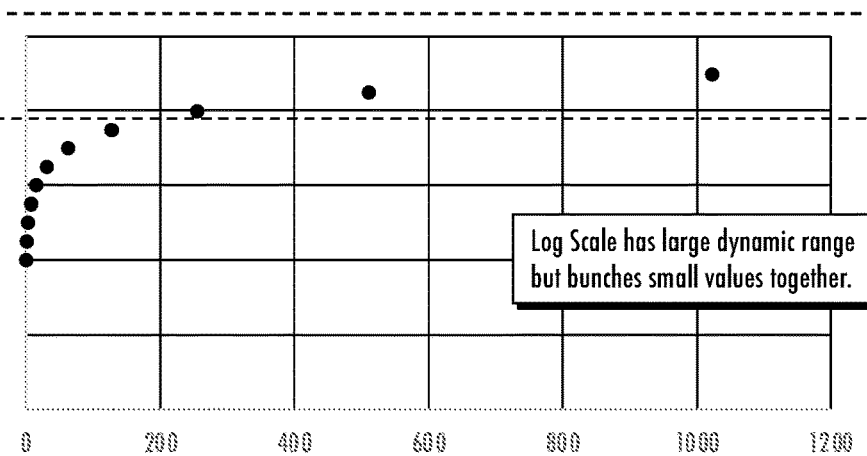
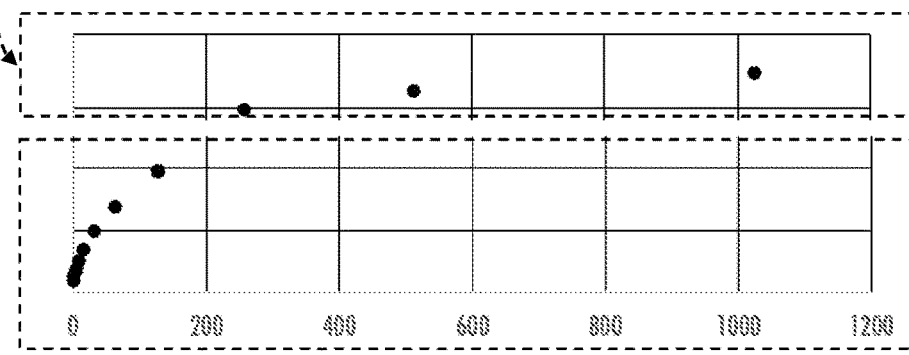
FIG. 3

| | A | B | C | D | E | F | G | H | I | J | K | L | M | N | O | P | Q |
|---|---|---|---|---|---|---|---|---|---|---|---|---|---|---|---|---|---|
| 1 | | READOUT BITDEPTH (Rbd): | | 12 | | | | | NOISEPROFILE: | | 12 | | | HIGHLIGHT NOISE, BOTTOM (HighN_Bot) | | | -0.000122 |
| 2 | | ENCODE BITDEPTH (Ebd): | | 10 | | | | | LSBERROR: | | 0.5 | | | HIGHLIGHT NOISE, TOP (HighN_Top) | | | 0.000122 |
| 3 | | | | LOGBASE: | | 1000 | | | | | | | | SHADOW NOISE, BOTTOM (ShadN_Bot) | | | -0.000008 |
| 4 | | DIFFERENCE IN EXPOSURE (2ndEx): | | | | 4 | | | | | | | | SHADOW NOISE, TOP (ShadN_Top) | | | 0.000008 |
| 5 | | | | | | | | | | | | | | | | | |
| 6 | STOP | STOPVALUE | HIGHLIGHT EXPOSURE (HighEx) | SHADOW EXPOSURE (ShadEx) | HIGHLIGHT NOISE RANGE, BOTTOM (HighNR_Bot) | HIGHLIGHT NOISE RANGE, TOP (HighNR_Top) | SHADOW NOISE RANGE, BOTTOM (ShadNR_Bot) | SHADOW NOISE RANGE, TOP (ShadNR_Top) | BLEND% | BLEND BOTTOM (BLEND_Bot) | BLEND TOP (BLEND_Top) | NOISE LOG, BOTTOM (NLog_Bot) | NOISE LOG, TOP (NLog_Top) | LOG BIT DEPTH, BOTTOM (LogBD_Bot) | LOG BIT DEPTH, UPPER (LogBD_Top) | NOISE CODEWORDS (Noise/Stop) | SIGNAL CODEWORDS (Signal/Stop) |
| 7 | 0 | 4096 | 1.000000 | 0 | 0.999878 | 1.000122 | 0 | 0 | 0.00 | 0.999878 | 1.000122 | 0.999982 | 1.000018 | 1024 | 1024 | 0.0 | 103 |
| 8 | 1 | 2048 | 0.500000 | 0 | 0.499878 | 0.500122 | 0 | 0 | 0.00 | 0.499878 | 0.500122 | 0.899766 | 0.899837 | 921 | 921 | 0.1 | 102 |
| 9 | 2 | 1024 | 0.250000 | 0 | 0.249878 | 0.250122 | 0 | 0 | 0.00 | 0.249878 | 0.250122 | 0.799677 | 0.799817 | 819 | 819 | 0.1 | 102 |
| 10 | 3 | 512 | 0.125000 | 0 | 0.124878 | 0.125122 | 0 | 0 | 0.00 | 0.124878 | 0.125122 | 0.699840 | 0.700120 | 717 | 717 | 0.3 | 102 |
| 11 | 4 | 256 | 0.062500 | 0.062500 | 0.062378 | 0.062622 | 0.062492 | 0.062508 | 1.00 | 0.062492 | 0.062508 | 0.600765 | 0.600799 | 615 | 615 | 0.0 | 100 |
| 12 | 5 | 128 | 0.031250 | 0.031250 | 0.031128 | 0.031372 | 0.031242 | 0.031258 | 1.00 | 0.031242 | 0.031258 | 0.502669 | 0.502737 | 515 | 515 | 0.1 | 98 |
| 13 | 6 | 64 | 0.015625 | 0.015625 | 0.015503 | 0.015747 | 0.015617 | 0.015633 | 1.00 | 0.015617 | 0.015633 | 0.406718 | 0.406851 | 416 | 417 | 0.1 | 94 |
| 14 | 7 | 32 | 0.007813 | 0.007813 | 0.007690 | 0.007935 | 0.007805 | 0.007820 | 1.00 | 0.007805 | 0.007820 | 0.314479 | 0.315030 | 322 | 323 | 0.3 | 87 |
| 15 | 8 | 16 | 0.003906 | 0.003906 | 0.003784 | 0.004028 | 0.003899 | 0.003914 | 1.00 | 0.003899 | 0.003914 | 0.229909 | 0.230359 | 235 | 236 | 0.5 | 75 |
| 16 | 9 | 8 | 0.001953 | 0.001953 | 0.001831 | 0.002075 | 0.001945 | 0.001961 | 1.00 | 0.001945 | 0.001961 | 0.156290 | 0.157038 | 160 | 161 | 0.8 | 59 |
| 17 | 10 | 4 | 0.000977 | 0.000977 | 0.000854 | 0.001099 | 0.000969 | 0.000984 | 1.00 | 0.000969 | 0.000984 | 0.098806 | 0.099123 | 100 | 102 | 1.1 | 42 |
| 18 | 11 | 2 | 0.000488 | 0.000488 | 0.000366 | 0.000610 | 0.000481 | 0.000496 | 1.00 | 0.000481 | 0.000496 | 0.056671 | 0.058254 | 58 | 60 | 1.5 | 27 |
| 19 | 12 | 1 | 0.000244 | 0.000244 | 0.000122 | 0.000366 | 0.000237 | 0.000252 | 1.00 | 0.000237 | 0.000252 | 0.030705 | 0.032479 | 31 | 33 | 1.8 | 15 |
| 20 | 13 | 0.5 | 0 | 0.000122 | 0 | 0 | 0.000114 | 0.000130 | 1.00 | 0.000114 | 0.000130 | 0.015671 | 0.017638 | 16 | 18 | 2.0 | 8 |
| 21 | 14 | 0.25 | 0 | 0.000061 | 0 | 0 | 0.000053 | 0.000069 | 1.00 | 0.000053 | 0.000069 | 0.007525 | 0.009604 | 8 | 10 | 2.1 | 4 |
| 22 | 15 | 0.125 | 0 | 0.000031 | 0 | 0 | 0.000023 | 0.000038 | 1.00 | 0.000023 | 0.000038 | 0.003273 | 0.005414 | 3 | 6 | 2.2 | 2 |
| 23 | 16 | 0.0625 | 0 | 0.000015 | 0 | 0 | 0.000008 | 0.000023 | 1.00 | 0.000008 | 0.000023 | 0.001099 | 0.003273 | 1 | 3 | 2.2 | 2 |
| 24 | | | 0 | 0 | 0 | 0 | 0 | 0 | 0.00 | 0 | 0 | 0.000000 | 0.000000 | 0 | 0 | 0.0 | 0 |

FIG. 4

| | A | B | C | D | E | F | G | H | I | J | K | L | M | N | O | P | Q |
|---|---|---|---|---|---|---|---|---|---|---|---|---|---|---|---|---|---|
| 1 | | | READOUT BITDEPTH (Rbd): | | | 10 | | | NOISEPROFILE: | | 12 | | HIGHLIGHT NOISE, BOTTOM (HighN$_{Bot}$) | | | | −0.000122 |
| 2 | | | ENCODE BITDEPTH (Ebd): | | | 10 | | | LSBERROR: | | 0.5 | | HIGHLIGHT NOISE, TOP (HighN$_{Top}$) | | | | 0.000122 |
| 3 | | | LOGBASE: | | | 1000 | | | | | | | SHADOW NOISE, BOTTOM (ShadN$_{Bot}$) | | | | −0.000002 |
| 4 | | | DIFFERENCE IN EXPOSURE (2ndEx): | | | 6 | | | | | | | SHADOW NOISE, TOP (ShadN$_{Top}$) | | | | 0.000002 |
| 5 | | | | | | | | | | | | | | | | | |
| 6 | STOP | STOPVALUE | HIGHLIGHT EXPOSURE (HighEx) | SHADOW EXPOSURE (ShadEx) | HIGHLIGHT NOISE RANGE, BOTTOM (HighNR$_{Bot}$) | HIGHLIGHT NOISE RANGE, TOP (HighNR$_{Top}$) | SHADOW NOISE RANGE, BOTTOM (ShadNR$_{Bot}$) | SHADOW NOISE RANGE, TOP (ShadNR$_{Top}$) | BLEND% | BLEND BOTTOM (BLEND$_{Bot}$) | BLEND TOP (BLEND$_{Top}$) | NOISE LOG, BOTTOM (NLog$_{Bot}$) | NOISE LOG, TOP (NLog$_{Top}$) | LOG BIT DEPTH, BOTTOM (LogBD$_{Bot}$) | LOG BIT DEPTH, UPPER (LogBD$_{Top}$) | NOISE CODEWORDS (Noise/Stop) | SIGNAL CODEWORDS (Signal/Stop) |
| 7 | 0 | 1024 | 1.000000 | 0 | 0.999878 | 1.000122 | 0 | 0 | 0.00 | 0.999878 | 1.000122 | 0.999982 | 1.000018 | 1024 | 1024 | 0.0 | 103 |
| 8 | 1 | 512 | 0.500000 | 0 | 0.499878 | 0.500122 | 0 | 0 | 0.00 | 0.499878 | 0.500122 | 0.899766 | 0.899837 | 921 | 921 | 0.1 | 102 |
| 9 | 2 | 256 | 0.250000 | 0 | 0.249878 | 0.250122 | 0 | 0 | 0.00 | 0.249878 | 0.250122 | 0.799677 | 0.799817 | 819 | 819 | 0.1 | 102 |
| 10 | 3 | 128 | 0.125000 | 0 | 0.124878 | 0.125122 | 0 | 0 | 0.00 | 0.124878 | 0.125122 | 0.699840 | 0.700120 | 717 | 717 | 0.3 | 102 |
| 11 | 4 | 64 | 0.062500 | 0 | 0.062378 | 0.062622 | 0 | 0 | 0.00 | 0.062378 | 0.062622 | 0.600530 | 0.601060 | 615 | 615 | 0.6 | 100 |
| 12 | 5 | 32 | 0.031250 | 0 | 0.031128 | 0.031372 | 0 | 0 | 0.00 | 0.031128 | 0.031372 | 0.502154 | 0.503250 | 514 | 515 | 1.1 | 98 |
| 13 | 6 | 16 | 0.015625 | 0.015625 | 0.015503 | 0.015747 | 0.015623 | 0.015627 | 1.00 | 0.015623 | 0.015627 | 0.406768 | 0.406801 | 417 | 417 | 0.0 | 94 |
| 14 | 7 | 8 | 0.007813 | 0.007813 | 0.007690 | 0.007935 | 0.007811 | 0.007814 | 1.00 | 0.007811 | 0.007814 | 0.314873 | 0.314936 | 322 | 322 | 0.1 | 87 |
| 15 | 8 | 4 | 0.003906 | 0.003906 | 0.003784 | 0.004028 | 0.003904 | 0.003908 | 1.00 | 0.003904 | 0.003908 | 0.230078 | 0.230191 | 236 | 236 | 0.1 | 75 |
| 16 | 9 | 2 | 0.001953 | 0.001953 | 0.001831 | 0.002075 | 0.001951 | 0.001955 | 1.00 | 0.001951 | 0.001955 | 0.156571 | 0.156758 | 160 | 161 | 0.2 | 59 |
| 17 | 10 | 1 | 0.000977 | 0.000977 | 0.000854 | 0.001099 | 0.000975 | 0.000978 | 1.00 | 0.000975 | 0.000978 | 0.098426 | 0.098705 | 101 | 101 | 0.3 | 42 |
| 18 | 11 | 0.5 | 0 | 0.000488 | 0 | 0 | 0.000486 | 0.000490 | 1.00 | 0.000486 | 0.000490 | 0.057329 | 0.057699 | 59 | 59 | 0.4 | 27 |
| 19 | 12 | 0.25 | 0 | 0.000244 | 0 | 0 | 0.000242 | 0.000246 | 1.00 | 0.000242 | 0.000246 | 0.031373 | 0.031816 | 32 | 33 | 0.5 | 15 |
| 20 | 13 | 0.125 | 0 | 0.000122 | 0 | 0 | 0.000120 | 0.000124 | 1.00 | 0.000120 | 0.000124 | 0.016412 | 0.016903 | 17 | 17 | 0.5 | 8 |
| 21 | 14 | 0.0625 | 0 | 0.000061 | 0 | 0 | 0.000059 | 0.000063 | 1.00 | 0.000059 | 0.000063 | 0.008308 | 0.008828 | 9 | 9 | 0.5 | 4 |
| 22 | 15 | 0.03125 | 0 | 0.000031 | 0 | 0 | 0.000029 | 0.000032 | 1.00 | 0.000029 | 0.000032 | 0.004080 | 0.004615 | 4 | 4 | 0.5 | 2 |
| 23 | 16 | 0.015625 | 0 | 0.000015 | 0 | 0 | 0.000013 | 0.000017 | 1.00 | 0.000013 | 0.000017 | 0.001918 | 0.002462 | 2 | 2 | 0.6 | 2 |
| 24 | | | | | 0 | 0 | 0 | 0 | 0.00 | 0.000000 | 0.000000 | 0.000000 | 0.000000 | 0 | 0 | 0.0 | 0 |

FIG. 5

SYSTEMS, APPARATUS, AND METHODS FOR COLOR SPACE REPRESENTATION

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of digital cameras. More particularly, the present disclosure relates to systems, computer programs, devices, and methods for color space representation.

DESCRIPTION OF RELATED TECHNOLOGY

Most digital cameras measure light intensity with an array of photosensors and a color filter array. The light intensity and color information is stored to digital media as a raw image file. Image signal processing "develops" the raw data to a color space format (e.g., RGB, YUV, YCrCb, etc.) for encoding, transfer, and/or display. Subsequent processing may be performed to achieve certain desired effects. For example, lossy coding may reduce downstream processing complexity and/or memory footprint. Similarly, image processing and editing can be used to impart aesthetic modifications that affect human perception.

Digital photography has several advantages over traditional "film-based" photography. Image processing is performed in the digital domain, thus digital photography is deterministic and consistent (perfectly reproducible). Additionally, digital media preserves images more robustly than photochemical film. Data may also be error-corrected and duplicated without loss of fidelity, digital media also does not degrade at the same rate as photo-sensitive chemicals.

The digital photography infrastructure is standardized such that the various participants of the ecosystem (e.g., manufacturers, component vendors, customers, etc.) can interact without interoperability issues. For example, REC. 709 is a standard promulgated by the ITU (International Telecommunication Union) for image encoding and signal characteristics of High-Definition TV (HDTV). Other notable examples include e.g., REC. 601 (Standard-Definition TV (SDTV)), REC. 2020 (Ultra High-Definition TV (UHDTV)), REC. 2100 (High-Dynamic Range TV (HDR-TV)), sRGB (web/computer graphics based on REC. 709), etc. Shared image encoding formats ensure that different members of the ecosystem (e.g., camera manufacturers and HDTV manufacturers, etc.) can each develop their products with confidence that their devices will operate as intended (e.g., capture/render colors) within the ecosystem.

Existing image encoding standards represent colors within a "color space." A color space uses a mathematical model to represent colors as tuples of numbers (e.g., triples in RGB, triples in YCrCb, quadruples in CMYK, etc.) relative to a reference color space. The typical reference color space is the CIEXYZ color space, which was specifically designed to encompass all colors the average human can see.

BRIEF DESCRIPTION OF THE DRAWINGS

FIG. 3 is a graphical representation of a Hybrid Log-Gamma (HLG) transfer function, useful for explaining various aspects of the present disclosure.

FIGS. 4-5 are spreadsheet analysis of an exemplary log-based color space compression scheme, in accordance with various aspects of the present disclosure.

DETAILED DESCRIPTION

In the following detailed description, reference is made to the accompanying drawings which form a part hereof, wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Codec Bit Depth Limitations in Device Ecosystems

Figure 1:
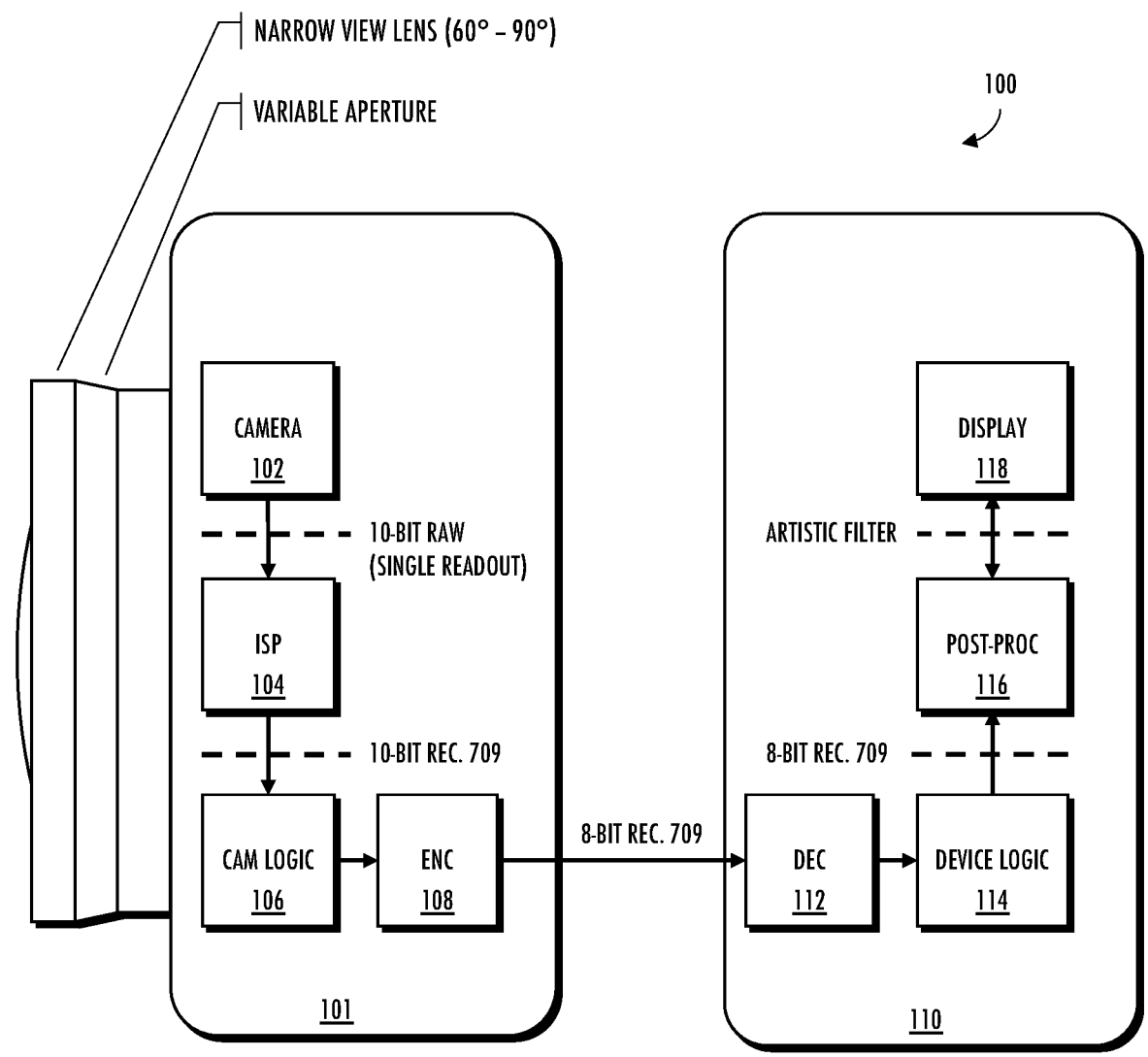
FIG. 1 depicts one device ecosystem, useful to illustrate various aspects of the present disclosure.

FIG. 1 depicts one device ecosystem useful to illustrate various aspects of the present disclosure. As shown, the device ecosystem 100 includes a digital camera 101 and a display device 110. During operation, the digital camera captures an image via a camera sensor 102; the raw image format stores light intensity (luminance) and color information (chrominance) according to the dynamic range and spatial geometry of the sensor's individual photosensor elements. Notably, the raw format is device specific; photosensors may be arranged in a variety of different spatial orientations and/or configurations (e.g., triangular, rectangular, hexagonal, mixed polygon, etc.).

As a brief aside, in digital photography, "exposure" is based on three parameters: aperture, ISO (sensor gain) and shutter speed (exposure time). Exposure determines how light or dark an image will appear when it's been captured by the camera. During normal operation, a digital camera may automatically adjust aperture, ISO, and shutter speed to control the amount of light that is received. So-called "point-and-shoot" digital cameras have a field-of-view of approximately 60°; digital single-lens reflex (DSLR) cameras can be used with lens attachments that change the field-of-view (typically in the range of 30° to) 90°. In traditional photography, the maximum field-of-view is limited to preserve rectilinear properties (e.g., straight lines appear straight). Most cameras allow a user to set fixed values and/or ranges of aperture, ISO, and shutter speed, to achieve desirable aesthetic effects (e.g., shot placement, blur, depth of field, noise, etc.).

During capture, the camera sensor 102 is exposed to light photons. Each photosensor element ("photosite") of the camera sensor 102 converts the incident photons to electrical charge ("photoelectrons"). The "quantum efficiency" of conversion is measured by the number of incident photons that are converted to photoelectrons (a photoelectron is an electron that is ejected from the surface of a material by the photoelectric properties of the photosensor). For example, if a photosensor element generates 4 photoelectrons from 10 incident photons, then then the quantum efficiency is 40%. Typical values of quantum efficiency for solid-state imagers are in the range of 30%-60%.

Most consumer grade devices use a "single readout" camera sensor with electronic rolling shutter (ERS) to expose rows of photosensor elements ("pixels") to light at slightly different times during the image capture. Specifically, CMOS image sensors use two pointers to erase and read each pixel value. An erase pointer discharges the photosensor elements (or rows/columns/arrays of cells) of the sensor to erase it; a readout pointer then follows the erase pointer to read the contents of the photosensor elements/pixels. The capture time is the time delay in between the erase and readout pointers. Each photosensor element/pixel accumulates the light for the same exposure time but they are not erased/read at the same time since the pointers sequentially scan through the rows. This slight temporal shift between the start of each row may result in a deformed image if the image capture device (or subject) moves. Notably, the ERS scan rate is directly related to exposure time, thus single readout camera sensors capture image data with only one exposure setting.

Referring back to FIG. 1, the raw image data is "developed" (in reference to developing photochemical film) to generic non camera-specific color space formats that are suitable for other devices to display. In the illustrated example, the image signal processor (ISP) 104 demosaics the spatially sampled luminance/color information to red-green-blue (RGB) values. As a brief aside, human sensitivity to red, blue, and green change over different lighting conditions; for example, the human eye can perceive red in bright light, but in low light conditions blue and green light dominate the spectral response. Similarly, camera sensors have a linear spectral sensitivity for red, blue, and green light that is based on a number of design parameters (e.g., quantum efficiency, photosite size, etc.). In order to correctly display colors the way that a human would perceive them, the captured image data (the raw image data) must be white balanced and color corrected. The resulting image data is encoded according to the desired output presentation color space (e.g., REC. 709, REC. 2020, etc.).

So-called "look-up-tables" (LUTs) are one common technique for converting RGB values between different color spaces. LUTs have a predefined mapping of input RGB values to output RGB values. For example, a camera may use its own camera-specific LUT to convert its white balanced and color corrected RGB output to RGB values for e.g., REC. 709, REC. 2020, etc. The conversion process is lossy, and irreversible, since most mappings convert multiple input RGB values to the same output RGB value.

Once the raw image data is converted (developed) to a presentation color space, in-camera pre-processing logic 106 may perform any number of data manipulations based on device and/or pipeline considerations. For example, the in-camera logic may compress/de-compress image data to improve device processing performance, reduce memory footprint, and/or reduce battery consumption. Some pre-processing may trigger in-camera logic or provide useful information to downstream sink applications.

As shown in the device ecosystem 100, the encoder 108 encodes in-camera pre-processed image data for delivery off-camera. In the illustrated embodiment, the digital camera 101 generates "ready-to-share" footage that is suitable for the largest segment of the device ecosystem 100; in this case, most peer devices use 8-bit REC. 709. Once encoded, image data may be transferred to the display device 110 via removable media, network interfaces, and/or wireless transmission; common examples of removable media include e.g., non-volatile memory cards (such as MMC, SD, mini-SD, and micro-SD cards), flash drives, hard drives, etc.

Once transferred to the display device 110, the encoded content is decoded via a decoder 112. In some embodiments, in-device logic 114 (provided by the operating system or similar non-user application) may perform any number of data manipulations based on device, application, and/or pipeline considerations. Thereafter, the footage may be provided to user applications for post-processing 116 to artistically modify the image data according to the user's personal taste. Finally, the post-processed content is rendered via display 118. Examples of post-processing modifications may include, without limitation: additional adjustments to color, white balance, saturation, up conversion, down-conversion, color format conversion (e.g., RGB to YUV, etc.), display driver formatting (e.g., HDMI, SVGA, etc.).

Notably, the device ecosystem 100 of FIG. 1 is a relatively well-matched pairing of digital camera and display device capabilities. Under such conditions, the bit depth for the captured content is similar to the displayed content. While there is some image quality loss from the captured bit depth (10-bit) to the display bit depth (8-bit), the loss is imperceptible for ready-to-share applications and most consumer photography.

Existing color space representations (e.g., REC. 709, REC. 2020, etc.) are designed for the human visual system; these color space representations assume that encoded images are only rendered for human viewing. Recently, the cinematic and "power user" market has grown (and will continue to grow) in importance as camera technologies steadily improve in cost and quality. Modern camera markets have naturally bifurcated into: (i) "ready-to-share" applications and (ii) post-processed applications. While most consumer electronics are driven by ready-to-share photography, cinema professionals (and other power users) assume that captured footage is heavily post-processed. For example, a cinema director may capture a scene, make "look intent" notes (brighten shadows, reduce glare, etc.); subsequently thereafter, a professional colorist may go to extraordinary lengths to adjust the scene "in post" with video editing software.

Unlike most digital photography, action photography is captured under difficult conditions which are often out of the photographer's control. In many cases, shooting occurs in outdoor settings where there are very large differences in lighting (e.g., over-lit, well-lit, shaded, etc.). In many cases, the photographer does not control when/where the subject of interest appears and taking time to re-shoot is often not an option. Since action cameras are also ruggedized and compact, the user interface (UI/UX) may also be limited. Consider a mountain biker with an action camera mounted to their handlebars, recording a trip through a wilderness canyon. The mountain biker has only very limited ability to control the action camera setting mid-action, also the lighting conditions may dramatically change outside of the mountain biker's control. For example, as the mountain biker passes under trees and between the canyon walls, the camera must operate in the shadows. When the mountain biker enters open space, the camera may need to adjust to well-lit (or even high ambient light) conditions. Interesting points may only be fleeting moments in the periphery of capture that do not provide enough advance notice to allow a user to adjust capture settings (e.g., a startled deer bolting off).

Figure 2:
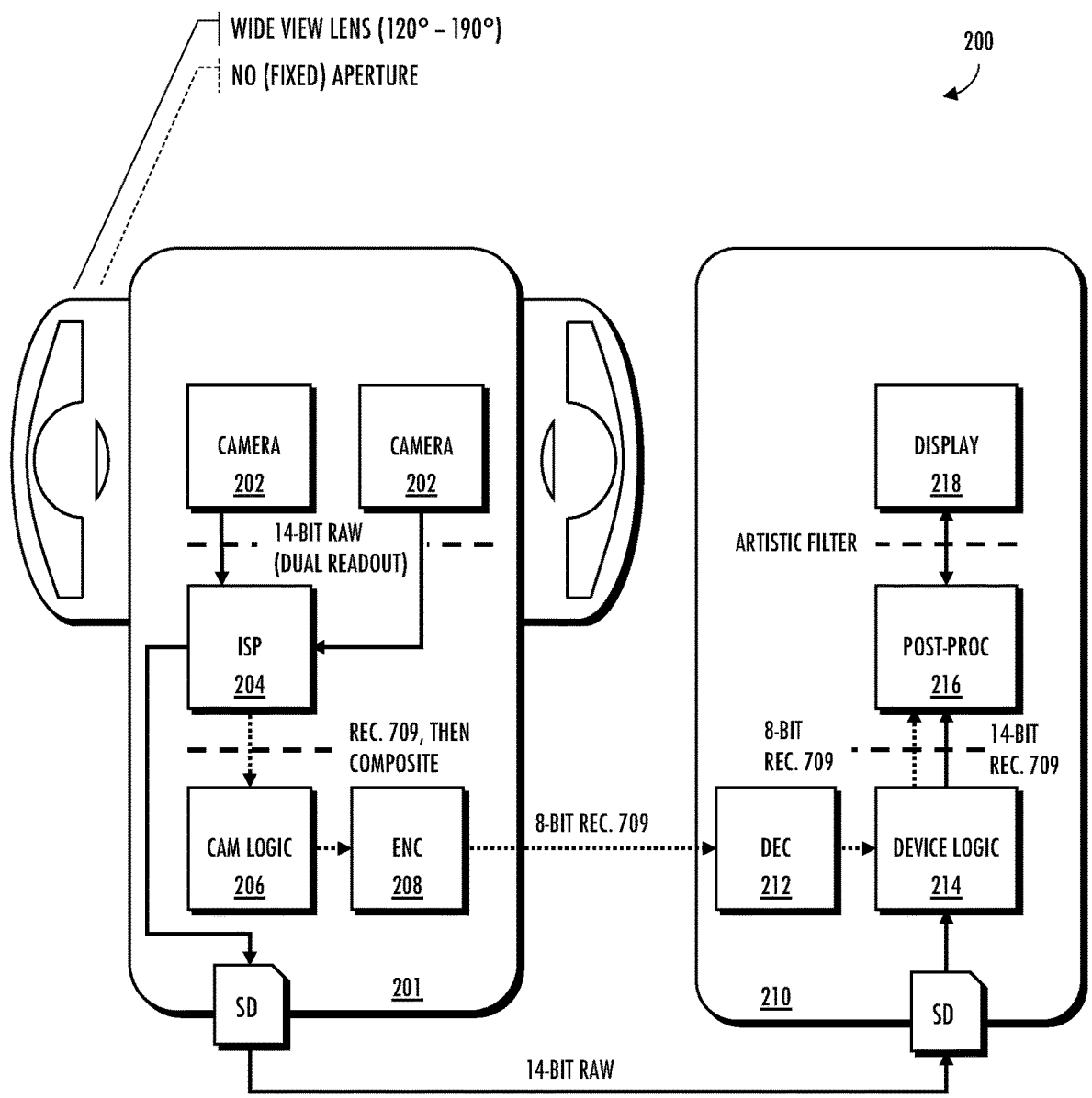
FIG. 2 depicts an action camera ecosystem, useful to illustrate various aspects of the present disclosure.

Referring now to FIG. 2, an action camera ecosystem useful to illustrate various aspects of the present disclosure is shown. Much like the digital camera 101 described above, the action camera 201 captures an image (via camera sensors 202), generates a non-camera-specific (generic) color space format (via the ISP 204), and may perform manipulations (via in camera pre-processing logic 206). The display device 210 decodes encoded content (via a decoder 212), performs in-device manipulations (via in-device logic 214), and any post-processing/display (via post-processing application 216 and display 218). Examples of post-processing modifications may include, without limitation: additional adjustments to color, white balance, saturation, up conversion, down-conversion, color format conversion (e.g., RGB to YUV, etc.), display driver formatting (e.g., HDMI, SVGA, etc.).

However, unlike other digital cameras the action camera 201 captures a wider field-of-view; for example, 120° (panorama), 180° (fisheye), or even 360° (spherical). Action cameras trade-off wider fields-of-view for rectilinearity. In this example, the action camera 201 uses two hyper-hemispherical (greater than 180° field-of-view) cameras arranged in a Janus-configuration to capture a full 360° panoramic view. The wider field-of-view ensures that the periphery is captured; this may be particularly useful where the camera is not pointed at the subject of interest.

Additionally, the action camera 201 does not have an adjustable aperture; instead, the action camera 201 relies only on ISO and shutter speed to control exposure. Each camera sensor has 12-bits of granularity (e.g., 4096 different discrete values), but uses a dual readout to achieve 14-bits, or even 16-bits, of linear range (e.g., 16,834-65,536 discrete values). Specifically, during "dual readout" operation, the CMOS image sensors perform a first "shadows" exposure using a first ISO setting and exposure time (e.g., $\frac{1}{120}^{th}$ of a second) and an immediate second "highlights" exposure using a second ISO setting and exposure time (e.g., $\frac{1}{2000}^{th}$ of a second, or 4-stops of difference). The two exposures are composited together to generate image data with a dynamic range that spans the first and second exposures. The increased dynamic range allows for a wider range of light conditions. A linear dynamic range of 16-bits exceeds most consumer applications; typically, 14-bits of linear dynamic range is sufficient to provide image details for both highlights and shadows in post-processing applications (circa 2021).

Image compositing is the process or technique of combining visual elements from separate sources into single images, often to create the illusion that all those elements are parts of the same scene. Image compositing has historically been used in post-processing by professional colorists to achieve a desired aesthetic effect (e.g., to implement the aforementioned "look intent" notes of a cinema director). Similar techniques are now used by "power users" for a variety of consumer applications and/or automated for the general public. For example, High-Dynamic Range (HDR) photography captures multiple images at different exposures, and then merges the exposures together to create a single image. Notably however, existing image compositing techniques are designed for human interaction and work with presentation color spaces (e.g., REC. 709, REC. 2020, etc.); in particular, compositing techniques (such as HDR) that compare, match, or otherwise analyze e.g., hue, contrast, white balance, saturation, etc. must share a developed color space. For example, as shown in FIG. 2, the 12-bit highlight and shadow exposures are first developed to REC. 709, and then composited.

While the composited image content could be encoded via the commodity codec pipeline (e.g., encoder 208 and decoder 212 of FIG. 2), doing so would crush the 14-bits of composited image content into an 8-bit pipeline. Highlights may be saturated, shadows may be driven to the floor, and midrange colors must be quantized down to a reduced number of hues. In other words, the image information that was carefully captured during dual readout cannot fit within the hardware pipeline. To obtain the most benefit of the action camera's capabilities, most power users use removable media (e.g., SD card) to transfer the file structure in its entirety (in raw format); image compositing is performed in post-processing, usually as a very manual process.

Compression Techniques for Bit Depth Limited Systems

A variety of compression techniques have been proposed to deal with bit depth limited codec pipelines. One salient example is the Hybrid Log-Gamma (HLG) standard for High-Dynamic Range TV (HDR TV). HLG was developed by the British Broadcasting Corporation (BBC) and Nihon Kyookai (NHK) (also known as the Japan Broadcasting Corporation) and is currently codified under ARIB STD-B67 promulgated by the Association of Radio Industries and Businesses (ARIB).

The HLG format encodes High-Dynamic Range TV (HDR TV) and Standard Dynamic Range TV (SDR TV) information into a single signal, enabling HDR-compatible TVs to display an enhanced image. This technique greatly reduces bandwidth requirements for broadcasters because they do not need to transmit their programming in both SDR and HDR.

FIG. 3 is a graphical representation of a Hybrid Log-Gamma (HLG) transfer function. HLG represents a 16-bit span of dynamic range, according to the piecewise transfer function of EQN. 4:

$$E' = \begin{cases} r\sqrt{E}, \text{ for the range } 0 \leq E \leq 1 \\ a\ln(E-b)+c, \text{ for the range } 1 < E \end{cases} \quad \text{EQN 4}$$

Where:
E is the signal normalized by the reference white level;
E' is the resulting non-linear signal;
r is the reference white level and has a value of 0.5; and
a is the constant 0.17883277;
b is the constant 1−4a=0.28466892; and
c is the constant ½−a ln(4a)=0.55991073.

Conceptually, the HLG combines "highlights" information (the most significant bits of the 16-bit span) with "shadows" information (the least significant bits of the 16-bit span), within a 10-bit span. On an SDR TV, from "black" to around the $7^{th}$ "stop", the color space representation remains very similar to REC. 709. Beyond the $7^{th}$ stop, the HLG curve allows a dynamic range much greater than REC. 709 to be squeezed into the commodity codec pipeline. Visually, shadows appear slightly darker than normal, the midrange may be slightly flat, and the highlights (which would be otherwise washed out) are at least present. On an HDR TV, the compressed log highlight range is stretched out to produce full HDR.

Exemplary Color Space Compression for Transport

Action cameras (such as the MAX™ and HERO™ series, manufactured by GoPro, Inc.) encourage their users to actively generate and edit their content. Unlike other products, action camera users often capture video and then review/edit the footage to immediately determine whether they have captured the shots that they wanted. In many cases, users may be limited to mobile devices that they have available (e.g., smart phones, tablets, and/or laptop computers). Typically, mobile device ecosystems communicate over wired/wireline interfaces using commodity codecs that have relatively low bit depth (e.g., 8-bit, 10-bit, etc.).

Dual readout sensors in consumer grade cameras substantially increase the amount of dynamic range that can be captured with commodity image sensors, however getting the image data off-camera through a limited hardware pipeline (e.g., commodity codecs) presents significant difficulties. Existing techniques for compressing large dynamic ranges into limited bit depth hardware pipelines are designed for (and well-suited to) "ready-to-view" applications. These techniques assume certain capabilities of the capture device, distribution infrastructure, and playback. For example, a camera that captures HDR footage can use the aforementioned HLG transfer function to provide HLG content over limited network bandwidth. However, such techniques are ill-suited to content that will be post-processed (rather than viewed "as-is").

Post-processing applications give users the ability to make a variety of different aesthetic modifications; for example, color corrections, cropping, adjustments to shadows/optical flares/specular highlights, etc. Typically, post-processing applications can work on either raw image data, or a developed color space format. However, since the developing process is lossy, the post-processing application may have limited flexibility with developed color space formats. As but one such example, a post-processing application can use the full dynamic range of raw image data to dig into shadows; e.g., picking out details in the lowermost ranges of the raw image data. Color can be adjusted for the lower light range (e.g., red may be attenuated relative to blue/green, etc.). Similarly, highlights can be appropriately reduced such that very large swings in light do not wash out, and the full spectrum of colors may be appropriately brightened (e.g., red levels may be brought to match blue/green, etc.).

Existing post-processing applications cannot recover image information from developed color space formats that have irreversibly quantized light information into fixed ranges and colors. For instance, the gamma curve portion of the HLG transfer function is backward compatible with SDR displays; this limits the image quality (number of codewords per stop) in the shadows. Merely amplifying brightness levels may be problematic since HLG does not provide enough information for color correction. Analogous issues are present in the highlights range. In other words, developed color spaces often cannot enable support certain types of editorial decisions (e.g., digging into shadows, dimming highlights, etc.).

Additionally, action photography introduces unique problems for image compositing which were previously ignored (or otherwise unknown). For example, HDR requires that both the camera and the subject remain stable since any movement between the successive exposures of HDR photographs will greatly affect subsequent image compositing. While this is a limitation for any camera, most digital cameras use narrow fields-of-view and often simplify subject recognition for image compositing; for example, a "selfie" might have a front-lit subject (foreground) against a dark landscape (background). The digital camera can use the highlights exposure for the front-lit subject and the shadows exposure for the background. In contrast, action footage is often captured with subject and/or camera movement; in many cases, shot placement may be imperfect/haphazard and cropped to the subject of interest in post-processing. In multiple lens photography (such as the action camera 201 of FIG. 2), additional steps may be required to stitch, stretch, shrink, warp, and/or smooth transitions across the different images; this may use weighted image data from one or more of the different exposures from each camera sensor.

In view of the foregoing, one exemplary embodiment of the present disclosure captures a first highlight exposure and a second shadow exposure using a dual readout sensor; the exposures may be linearly composited, and then compressed to a "transport" color space for delivery to another device. Unlike "presentation" color spaces that emphasize ease of display "as-is", the exemplary "transport" color space preserves desirable signal codeword and noise codeword relationships through reduced bit depths (e.g., a commodity codec pipeline).

As a brief aside, a myriad of techniques can be used to encode data into "codewords"; different encodings may confer useful properties such as e.g., data compression, error control (detection and/or correction), encryption, and/or transmission coding (e.g., line coding, differential signaling, etc.). In information theory, so-called "signal" or "signal codewords" represent meaningful data whereas "noise" and "noise codewords" represent meaningless data. Noise is undesirable, but may be a necessary trade-off (e.g., for more compression, etc.) or otherwise unavoidably introduced (e.g., unknown interference, quantization error, etc.).

Referring now to FIG. 4, a spreadsheet analysis of an exemplary log-based color space compression, useful in conjunction with various aspects of the present disclosure is presented. The spreadsheet provides a table of calculated results for the following equations (identified by column):

$$StopValue = 2^{(Rbd-Stop)} \quad \text{Col. B}$$

$$HighEx = \text{Truncate}\left(\frac{StopValue}{2^{Rbd}}\right) \quad \text{Col. C}$$

$$ShadEx = \frac{StopValue}{2^{Rbd}} \text{ when } \begin{array}{l} Stop \geq 2ndEx \text{ AND} \\ Stop - 2ndEX \leq Rbd \end{array} \quad \text{Col. D}$$

$$E: HighNR_{Bot} = \begin{cases} HighEx + HighN_{Bot}, \text{ when } HighEx > 0; \\ \text{otherwise:} \\ 0 \end{cases} \quad \text{Col. E}$$

$$F: HighNR_{Top} = \begin{cases} HighEx + HighN_{Top}, \text{ when } HighEx > 0; \\ \text{otherwise:} \\ 0 \end{cases} \quad \text{Col. F}$$

$$G: ShadNR_{Bot} = \begin{cases} ShadEx + ShadN_{Bot}, \text{ when } ShadEx > 0; \\ \text{otherwise:} \\ 0 \end{cases} \quad \text{Col. G}$$

$$H: ShadNR_{Top} = \begin{cases} ShadEx + ShadN_{Top}, \text{ when } ShadEx > 0; \\ \text{otherwise:} \\ 0 \end{cases} \quad \text{Col. H}$$

$$\text{Blend \%} = \begin{cases} 1 \text{ when } Stop \geq 2ndEx; \\ \text{otherwise:} \\ 0 \end{cases} \quad \text{Col. I}$$

$$Blend_{Bot} = HighNR_{Bot} * (1 - \text{Blend \%}) + ShadNR_{Bot} * \text{Blend \%} \quad \text{Col. J}$$

$$Blend_{Top} = HighNR_{Top} * (1 - \text{Blend \%}) + ShadNR_{Top} * \text{Blend \%} \quad \text{Col. K}$$

$$L: NLog_{Bot} = \log_{10}\left(\frac{Blend_{Bot} * (\text{Log Base} - 1) + 1}{\log_{10} \text{Log Base}}\right) \quad \text{Col. L}$$

$$M: NLog_{Top} = \log_{10}\left(\frac{Blend_{Top} * (\text{Log Base} - 1) + 1}{\log_{10} \text{Log Base}}\right) \quad \text{Col. M}$$

$$N: LogBD_{BoC} = NLog_{Bot} * 2^{Ebd} \quad \text{Col. N}$$

$$O: LogBD_{Top} = NLog_{Top} * 2^{Ebd} \quad \text{Col. O}$$

$$P: \text{Noise/Stop} = (NLog_{Top} - NLog_{Bot}) * 2^{Ebd} \quad \text{Col. P}$$

$$Q: \text{Signal/Stop} = \frac{LogBD_{Top(Stop)} + LogBD_{Bot(Stop)} - LogBD_{Top(Stop+1)} + LogBD_{Bot(Stop+1)}}{2} \quad \text{Col. Q}$$

Where:
Stop is a camera stop (light exposure measured in a power of 2);
StopValue is the value (linear) of the exposure at each camera stop;
Rbd is the readout bit depth of the camera sensor;
HighEx is the highlight exposure at each stop (when present);
ShadEx is the shadow exposure at each stop (when present);
2ndEx is the number of stops between the highlight and shadow exposures;
$HighNR_{Top}$ and $HighNR_{Bot}$ are the top and bottom of the highlight exposure noise range;
$ShadNR_{Top}$ and $ShadNR_{Bot}$ are the top and bottom of the shadow exposure noise range;
Blend % is the percentage of contribution from the highlight and shadow exposures to a High Dynamic Range (HDR) exposure;
$Blend_{Top}$ and $Blend_{Bot}$ are the top and bottom of the blended exposure;
$NLog_{Top}$ and $NLog_{Bot}$ are the top and bottom of the noise introduced by the exemplary log compression;

$LogBD_{Top}$ and $LogBD_{Bot}$ are the top and bottom of the signal words that can be compressed using HLG compression of LogBase;
Noise/Stop is the number of noise codewords that are quantized into the stop;
Signal/Stop is the number of signal codewords that are quantized into the stop;
Ebd is the encode bit depth of the codec;
NoiseProfile is a variable representing noise (e.g., 12);
LSBError is a constant representing bit errors $$\left(e.g., \frac{1}{2}\right);$$

$HighN_{Bot}$=−LSBError*$2^{-NoiseProfile}$;
$HighN_{Top}$=LSBError*$2^{-NoiseProfile}$;
$ShadN_{Bot}$=−$HighN_{Bot}$*$2^{-2ndEx}$; and
$ShadN_{Top}$=$HighN_{Top}$*$2^{-2ndEx}$.

In the spreadsheet analysis of the exemplary log-based color space compression, the camera obtains a highlight exposure and a shadow exposure from the dual readout sensor. Notably, the luminance values directly correspond to the number of photoelectrons that were collected by the photosite; similarly, the chrominance values (red, green, blue) correspond to the camera-specific color filter array (CFA) arrangement. Since, the raw image data corresponds to the light that was actually captured, linear operations (such as addition and scaling) can be directly performed on the highlight exposure and shadow exposure.

In one exemplary embodiment, in-camera image compositing may linearly use the luminance and chrominance data to sum and scale data across the highlight exposure and the shadow exposure. For example, shadow exposure image data may be scaled up, highlight exposure image data may be scaled down, and the scaled versions may be summed together. Once the two exposures are linearly combined and encoded into a linear color space, the exemplary log-based color space compression scheme compresses the large dynamic range to the appropriate bit depth for transport. In order to comply with codec data formats, the transport color space represents image information as numeric tuples. Additionally, metadata may be used to identify the transport color space and/or its relevant parameters (e.g., the log compression (LogBase), readout bit depth (Rbd), second exposure (2ndEx), encode bit depth (Ebd), etc.).

In the specific example of FIG. 4, a camera with a 12-bit sensor readout can generate a highlight exposure that spans 4096 to 1 linear values, and a shadow exposure that spans 256 to 0.0625 linear values; these two exposures are encoded to a 10-bit image file. In effect, 65,536 different quantization levels (16-bits) collected by the camera sensor are compressed into 1024 quantization levels (10-bits) for encoding. The calculated example uses a NoiseProfile of 12, and LSBError of ½; these values are implementation specific and may be adjusted by an artisan of ordinary skill in the related arts, given the contents of the present disclosure, based on any number of implementation considerations. In this example, 131 codewords are mapped to 2047 quantization levels at Stop 0 (the range of 4096-2049, or 2047 different values), 136 codewords are mapped to 2048 quantization levels at Stop 1, (the range of 2048-1025, or 1023 different values) etc. The noise codewords (which are indistinguishable from signal codewords) are 0.0 at Stop 0, 0.1 at Stop 1, etc.

The exemplary log-based compression scheme balances computational simplicity with desirable signal and noise characteristics. Notably, the compression of FIG. 4 uses an integer log base (1000) that is computationally much simpler than natural log (ln) calculations based on floating point parameters that are tuned for human vision (e.g., a=0.17883277, b=0.28466892, and c=0.55991073; see EQN. 4 discussed above). In the illustrated embodiment, the "blend" function selects exposure image data from the exposure with the more desirable signal-to-noise relationships (mathematically expressed in the equations of Col. J and Col. K above). For example, Stop 4 uses $ShadNR_{Top}$ and $ShadNR_{Bot}$ for $Blend_{Top}$ and $Blend_{Bot}$ rather than $HighNR_{Top}$ and $HighNR_{Bot}$; this results in a larger $NLog_{Bot}$ (i.e., 0.600765 instead of 0.600503), etc. Blending the dual readout exposures provides slightly more image quality for post-processing.

The exemplary log-based compression scheme is focused on "transport" color space compression that preserves captured image information for transport through a hardware pipeline. Instead of using a presentation color space (REC. 709, 2020) that is optimized for human perception, the exemplary embodiment stores the captured image data in a compressed space that minimizes signal loss in preparation for its hardware pipeline constraints. The compressed space can be converted back to linear color space (or translated directly from log space) to any other arbitrary color space for subsequent display, manipulation, modification, and presentation.

Additionally, providing a consistent analytical framework may enable devices to dynamically adjust their behavior. As but one example, a source device that has no internal bit depth bottleneck could nonetheless accommodate external codec limitations. Consider a camera with a 12-bit capable codec that is connected to an external network with commodity codecs (10-bit), the camera may downshift to a different compression scheme by adjusting the encode bit depth (Ebd). In another example, a source device that is aware of its hardware pipeline bottlenecks could selectively adjust compression on-the-fly, e.g., a smartphone with a front camera using a 12-bit sensor readout, and a selfie camera using a 10-bit sensor readout, could use different log compressions with its 10-bit codec. In other words, the numeric analysis and tools described herein may be broadly extended to any participant or component of the hardware pipeline that bottlenecks the device ecosystem and/or operation. Notably, this is in direct contrast to standardized color spaces and/or compression schemes (e.g., REC. 709, 2020, and/or ARIB STD-B67(HLG)) which do not change compression on-the-fly based on bit depth of the hardware pipeline.

FIG. 5 provides an alternative spreadsheet analysis to demonstrate the flexibility of the analytical framework. The spreadsheet uses the same formulas and relationships as was previously discussed with respect to FIG. 4, however the parameters for readout bit depth (Rbd) and second exposure (2ndEx) have been modified to 10-bits and 6 (from 12-bits and 4), respectively. This adjustment corresponds to a camera device that captures using a 10-bit sensor but provides a 16-bit span of dynamic range.

As a brief aside, large differences in exposure (e.g., more than 3 or 4 stops) may affect other operational parameters. For example, if the highlights exposure was 1/1000th of a second (at 100 ISO), then a shadow exposure at 6 stops of separation would need to be taken at 1/15th of a second. As a practical matter, larger exposure differences may introduce more artifacts since the highlight exposure may have noticeably less motion blur than the shadows exposure. This configuration may preclude typical frame rates (e.g., 30 or 60 fps for video), nonetheless, such settings may be useful for still photography and/or time lapse photography. Additionally, different sensor depths also affect camera operation. For example, different noise profiles and LSB errors may be useful for certain situations. In one exemplary embodiment, a 12-bit sensor may provide 10-bit readouts to provide faster performance with a minor loss in dynamic range. Other implementations may use the full 12-bit readout where speed is less important than bit depth.

Figure 6:
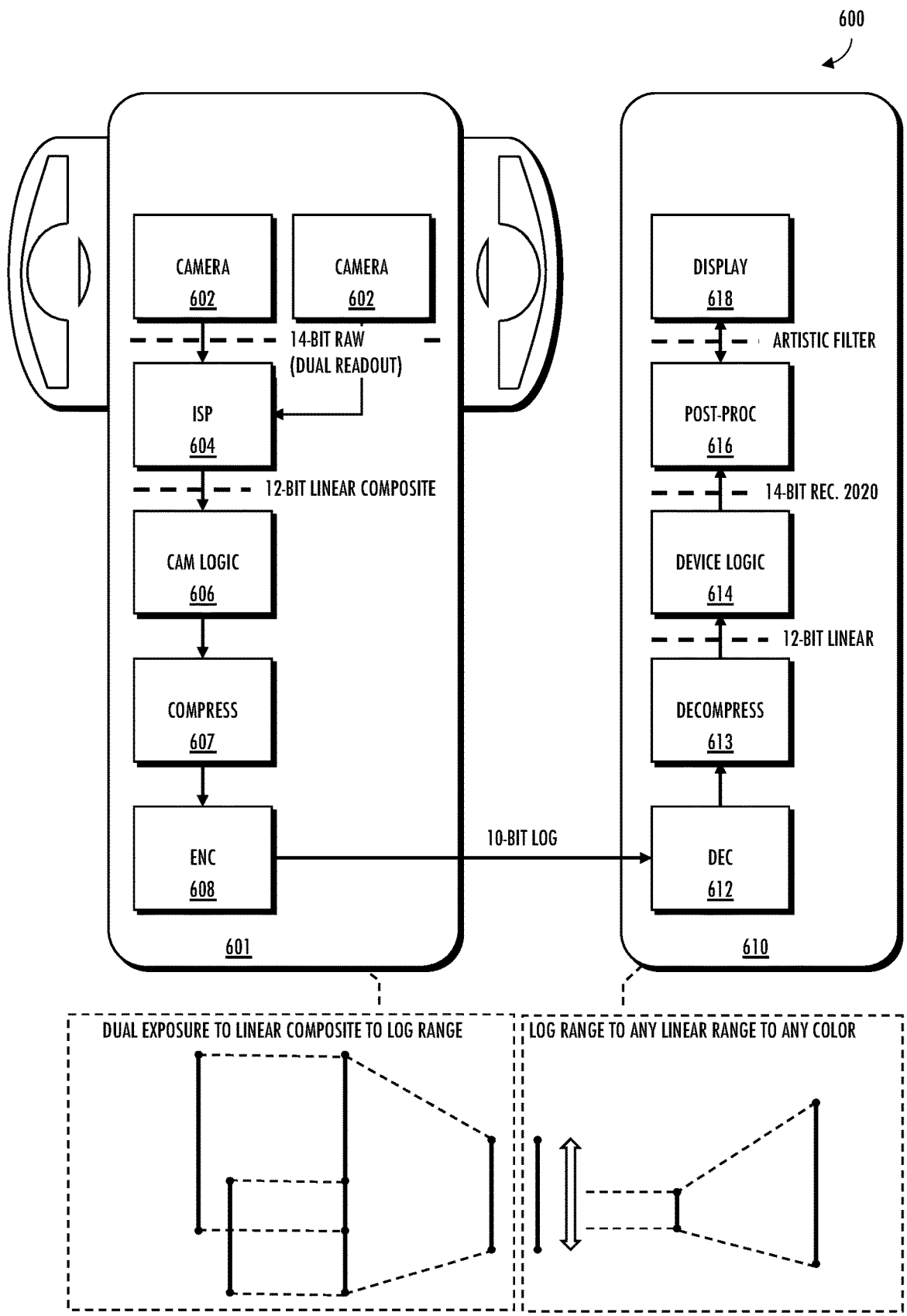
FIG. 6 is a graphical representation of one exemplary device ecosystem that performs source compression and sink decompression, in accordance with various aspects of the present disclosure.

FIG. 6 illustrates one exemplary device ecosystem 600 that performs source compression and sink decompression, in accordance with various aspects of the present disclosure. As shown, the exemplary device ecosystem 600 includes an action camera 601 and a display device 610. The action camera 601 captures two exposures (via a dual readout camera sensor 602), develops the exposures to a linear color space image for in-camera image compositing (via the ISP 604) and may perform data manipulations (via in-camera pre-processing logic 606). As previously noted, presentation color spaces like REC. 709, REC. 2020, etc. only span a subset of the camera's capabilities. In contrast, the linear color space preserves the full range of the camera sensor's data.

In the exemplary embodiment, the linear color space is compressed to log space with compression logic 607. Log compression in limited bit depth systems may introduce some quantization error; different implementations may use a variety of techniques to minimize such quantization errors. In particular, the linear-to-log conversion may be selected based on e.g., captured data, sensor bit depth, encoder bit depth, dynamic range, granularity, ease of computation, etc. In the illustrated embodiment, the compression logic 607 uses log base woo to compress 16 stops of 12-bit linear data to a 10-bit log space (see the analysis of FIG. 4, described above).

The compressed log space content is encoded via an encoder 608 for delivery to the display device 610. Subsequently thereafter, the display device 610 obtains the compressed log space content decodes the content via a decoder 612. Notably, codec operation is unaffected by color space selection (i.e., the tuples fit within acceptable ranges of the codec). The compressed log space content may be provided via wired or wireless transport (e.g., USB, Wi-Fi, etc.). In one specific implementation, the encoder 608 and/or decoder 612 may include High Efficiency Video Coding (HEVC) codecs (H.265), other implementations may use Advanced Video Coding (AVC) codecs (H.264). While the illustrated system is depicted with a dedicated encoder/decoder chain, artisans of ordinary skill in the related arts will readily appreciate that any number of hardware and/or software codec technologies may be substituted with equal success.

Referring now to the display device 610, in the exemplary embodiment, the 10-bit log space is expanded (decompressed) back into linear color space with decompression logic 613. The linear color space is then re-colored to a presentation color space (e.g., 14-bit REC. 2020) by in-device logic 614. Mathematically, the linear color space may be transformed via a matrix operation (or similar linear transformation). In fact, since the display device 610 has the full linear color space, any range within the linear color space may be used to reconstruct the appropriate color for the desired exposure.

Within the context of an action camera, this may be particularly useful because only a portion of a larger capture may be used. For example, the in-device logic 614 may assume or suggest an exposure, white balance, and/or color correction based on where the camera was pointed and the originally captured image data. Since, the camera may not have been pointed in the proper direction, the initial presentation color space may be undesirable. Notably, the conversion to presentation color space entails amplifying, attenuating, and/or clipping the linear color space for the assumed parameters. As a result, certain areas of the image may saturate or be washed out in the presentation color space (e.g., 14-bit REC. 2020).

The initial presentation color space may be presented on a display 618 (or cast to a remote display, etc.). Additionally, the display device 610 retains the linear color space which has the full dynamic range (16 stops) of the originally captured image data. In post-processing, the user can use the initial presentation color space to provide their "look intent" notes. For example, a narrow field-of-view (60°) centered on the action may be cut-out from e.g., an 360° panorama; thus, only the most interesting subset of the total linear dynamic range may be used (the deepest shadows may be omitted, and the brightest highlights can be ignored). A corrected presentation color space can be generated and presented to the user. In some variants, the full dynamic range of the originally captured image data may allow a user to apply sophisticated post-processing techniques. For example, the user may brighten/darken the image (in part or whole) to reveal objects that are hidden in the shadows/highlights. In other words, the transport color space allows for the post-processor 616 to implement any adjustments to the previously assumed/suggested exposure, white balance, and/or color correction, that were performed by the in-device logic 614.

As used herein, the term "transport color space" refers to a representation of data that spans the entire sensor range. For example, a transport color space for a camera represents the span of color space data (chrominance and luminance) that may be captured by the camera. Notably, different cameras have different capabilities, thus the transport color space may additionally include camera-specific data to assist in post-processing. More generally, transport representations may include metadata to assist in subsequent interpretation.

As used herein, the term "presentation color space" refers to a representation of data that spans the range of data that can be displayed/rendered. A device may support multiple presentation color spaces; for example, a display screen may support both REC. 2020 and REC. 709. Notably, a device may support both transport and presentation color spaces; for example, an action camera may capture image data at its maximum capability but present a reduced quality image (its onboard screen may have limited display capabilities).

As used herein, the term "developed color space" refers to a non-camera-specific representation of data (e.g., numeric tuples for each pixel value) that has been generated based on camera-specific image information. A developed color space may be either a transport color space or a reference color space.

While these techniques are illustrated in the context of action photography and a mobile device ecosystem, artisans of ordinary skill in the related arts will readily appreciate that the principles described herein may be broadly applicable to any photography that would benefit from the delivery of a very large dynamic range (e.g., using multiple readouts and/or sensors) over a small bandwidth.

Exemplary Device Ecosystem

Figure 7:
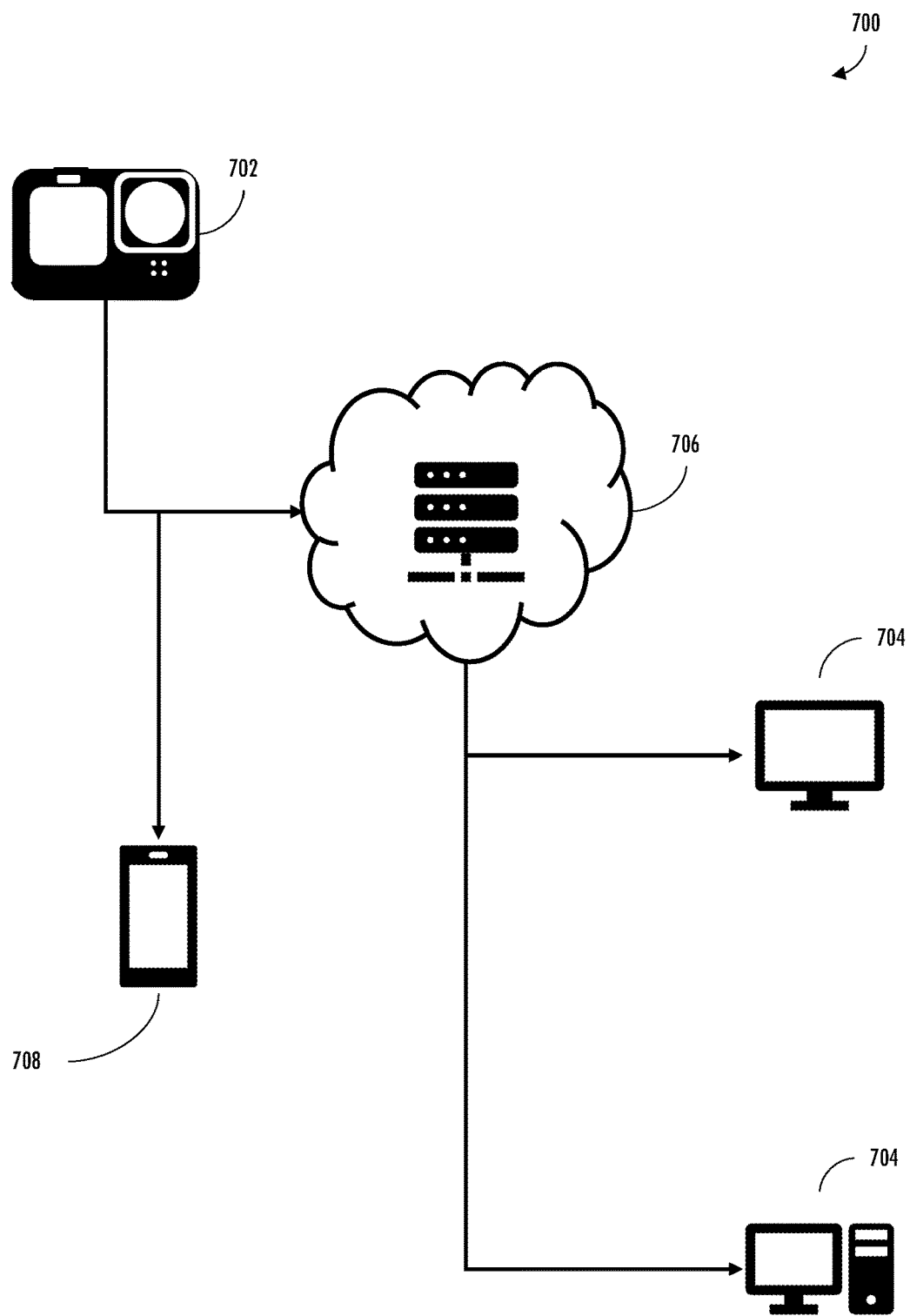
FIG. 7 is a logical block diagram of one exemplary device ecosystem, in accordance with various aspects of the present disclosure.

FIG. 7 is a logical block diagram of one exemplary device ecosystem 700, useful in conjunction with various aspects of the present disclosure. The exemplary device ecosystem 700 includes one or more source devices 702 and one or more sink devices 704. In the illustrated embodiment, the exemplary device ecosystem 700 includes an intermediary network 706. In other implementations (not shown), the one or more source devices 702 may be directly connected to the one or more sink devices 704 without the intermediary network. During exemplary operation, content is transferred from the source device(s) to the sink device(s). As but one such example, a source device may be a user's action camera that captures audio and/or video footage, the sink device(s) may include a user's television/laptop, and/or high-end workstation.

While the source device 702 is presented in the context of an action camera, the concepts described herein are broadly applicable to any source of content. In some embodiments, content may be captured and/or recorded from the environment (e.g., audio/visual (AV) footage). In other embodiments, content may be generated at the source device itself (e.g., computer generated graphics, mixers, etc.). Still other embodiments may receive, retrieve, and/or obtain content from other attached devices and/or peripherals. As but one such example, a webcam that is tethered to a laptop (or similar casting device) may capture image content for streaming over the Internet.

Similarly, while the sink device 704 is presented in the context of a television, laptop, and/or workstation, the concepts described herein are broadly applicable to any sink of content. In some embodiments, content may be presented to an audience (e.g., displayed, replayed, or otherwise rendered to a user). In other embodiments, content may be post-processed based on user input (e.g., artistically filtered, modified, cropped, edited, re-colored, etc.). Still other embodiments may convert content into another form of data. As but one such example, a user may transcode their footage to a variety of different color spaces (e.g., REC. 709 for older devices and REC. 2020 for newer devices).

The foregoing discussion has been illustrated with human creators and audiences. However, artisans of ordinary skill in the related arts will readily appreciate that the techniques described herein are not so limited. In other embodiments, the creator and/or audience could be machine-based. For example, security cameras and/or aerial drones could capture footage for surveillance algorithms. Notably, such applications often have entirely different considerations than human perception. In some variants, luminance may be more important that chrominance or vice versa. Similarly, extra-spectral photography (extending into infrared and/or ultraviolet ranges) may exceed the spectral capabilities of human vision. Other applications that may benefit from the techniques described herein include e.g., police/security/military applications, industrial automation, artificial intelligence/machine learning, fleet management, self-driving applications, and/or any other computer vision applications.

In some embodiments, a hybrid device 708 may be both a source and sink device (e.g., smart phone). In some cases, hybrid operation may be time-shifted, e.g., a device may capture a video as a source device, store the video onto an archival service, and retrieve the video later for playback/touch-ups as a sink device. In other cases, hybrid operation may require concurrent source/sink operation; for example, a user may capture a video and stream the video live as a source device while simultaneously playing a modified version of the video as a sink device (e.g., live video conferencing, etc.).

In one embodiment, the intermediary network 706 includes servers, routers, and/or any other computing appliance between the source and/or sink devices. More broadly, however, the concepts described herein may be broadly applicable to any set of logical nodes (distinctly addressable entities of the network) that may facilitate transfers of content between the one or more source devices 702 and one or more sink devices 704. Ad hoc networks, internets/intranets, peer networks (point-to-point or point-to-many) and/or any number of other computer networks may be substituted with equal success. Any communication protocol that is suitable for data transfer may be used in conjunction with the various principles described herein (e.g., WiFi (IEEE 802.11), IEEE 802.3 (Ethernet), USB, etc.). Similarly, any network topology may be used in conjunction with the various principles described herein (e.g., star, ring, mesh, bus, etc.).

In some embodiments, the intermediary network 706 may provide data transfer over substantial distances and/or differences in time. For instance, the user may subscribe to cloud services to provide e.g., storage space, anywhere access, and/or long-term archival for their content. In another such example, the user may also publish their content to others (e.g., a social network or similar content delivery network). In some cases, the intermediary network 706 may additionally modify the content based on network considerations. For instance, the intermediary network 706 may automatically detect image/video content and transcode the content for reliable delivery via commodity codecs (the least common denominator for all network devices). In other cases, the intermediary network 706 may transcode the content for bulk storage (such as is common with social networks).

As previously noted, source and sink devices have historically been limited to a standardized (presentation) color space representation under the assumption that the sink device would render the captured content "as-is." However, in one specific aspect of the present disclosure, the one or more sink devices 704 may each determine their own presentation color space representation independent of the transport color space representation provided from the source device 702. For example, the same transport color space provided by the action camera may be converted to different presentation color spaces for the television (e.g., REC. 709) and/or workstation (REC. 2020). Notably, different modalities of a hybrid device 708 may utilize different color spaces as well; for example, a smart phone may capture video in linear color space, store the video in log-compressed space, and subsequently display in a developed color space (e.g., REC. 2020).

In one such implementation, an action camera may capture image content with a very large dynamic range (e.g., 16 stops). Unfortunately, action cameras may have limited display capabilities (small size, limited brightness, etc.) and may be used under wide variations in lighting (full sun, complete darkness). Nonetheless, the camera display is often useful to check shot placement. In such cases, the image content may be captured with all 16-stops of linear color space, but only displayed in 7-stops. The presentation color space representation (7-stop) is camera specific, and the transport color space representation (16-stop) can be stored locally in linear color space, or log-compressed for delivery via the intermediary network 706 to other sink devices 704/hybrid devices 708.

Later, a smart television may obtain the log-compressed content and generate a local linear color space representation. The linear color space representation could be converted to a presentation color space (REC. 709) with 10 stops which is suitable for playback on television.

Similarly, a smart phone may use a similar process to convert the linear color space to a different presentation color space (e.g., REC. 2020). In some such cases, the smart phone may also use an after-market (downloadable) post-processing application to add any number of artistic effects. Furthermore, the smart phone screen may dynamically adjust stops depending on ambient light during playback (e.g., 7 stops in full sun, 12 stops in relative darkness).

Finally, studio production displays may be used for high end post-production; in some cases, the professional editor may require 14 stops to find the ideal exposure (e.g., digging into shadows and/or dimming highlights). Once completed, the post-processed content may be natively stored in multiple different formats (e.g., both REC. 709 and REC. 2020).

Various other device ecosystems and/or use cases may be substituted with equal success, the foregoing being purely illustrative.

Exemplary Methods and Apparatus

Figure 8:
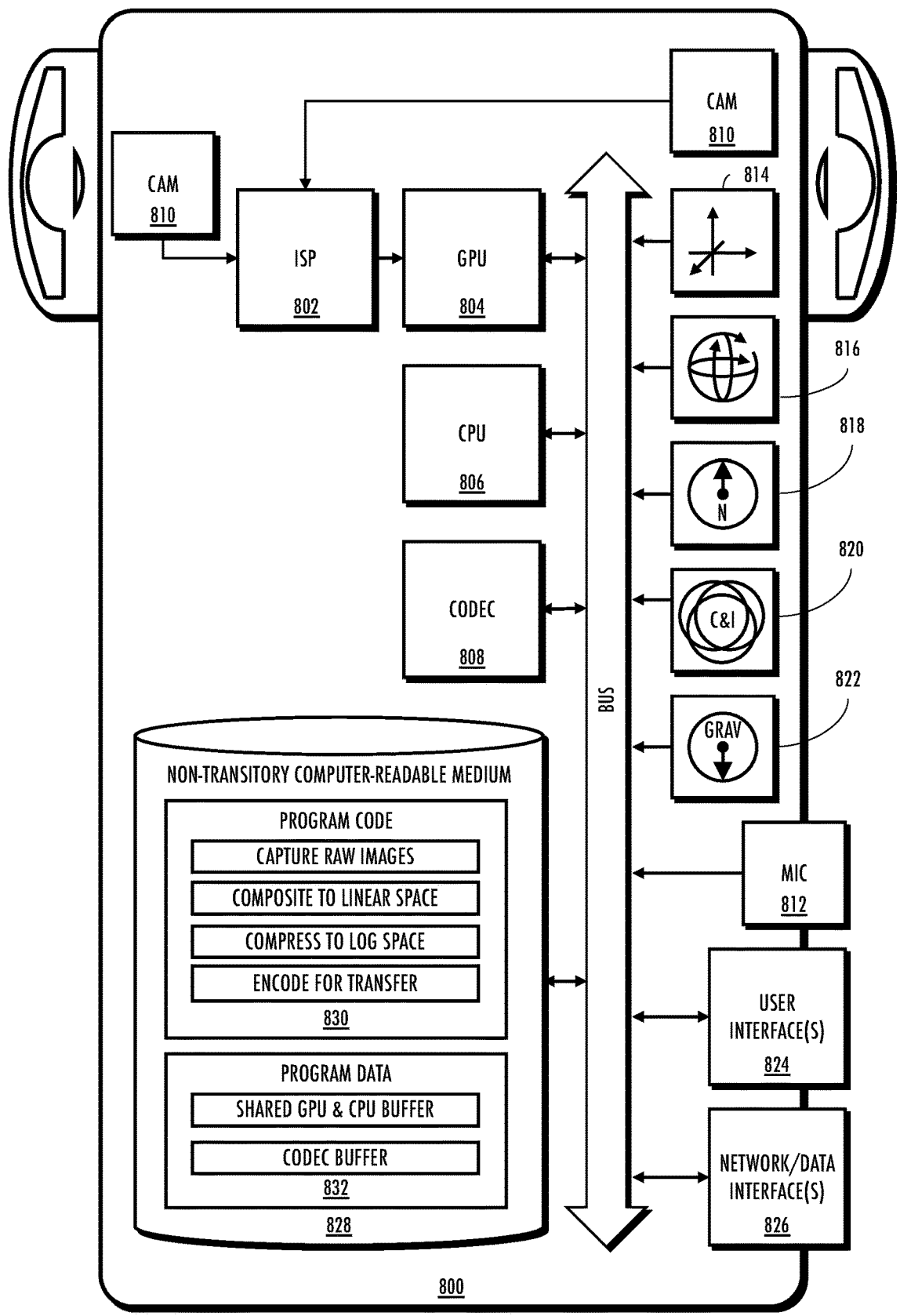
FIG. 8 is a logical block diagram of one exemplary source device, in accordance with various aspects of the present disclosure.

FIG. 8 is a logical block diagram of a source device 800, useful in conjunction with various aspects of the present disclosure. The source device Boo includes a processor subsystem, a memory subsystem, a sensor subsystem, a user interface subsystem, a network/data interface subsystem, and a bus to connect them. During operation, content is captured via the sensor subsystem, converted to linear color space for in-device processing, compressed to log space for out-of-device usage, and encoded for transfer via the data interface subsystem. In one exemplary embodiment, the source device 800 may be an action camera that captures audio and/or video footage. Other embodiments of source devices may include without limitation: a smart phone, a tablet, a laptop, an aerial drone, security cameras, self-driving cars, smart appliances and/or industrial automation, and/or any other source of data.

In one embodiment, the processor subsystem may read instructions from the memory subsystem and execute them within one or more processors. The illustrated processor subsystem includes: an image signal processor (ISP 802), a graphics processing unit (GPU 804), a central processing unit (CPU 806), and a hardware codec 808. In one specific implementation, the ISP 802 maps captured camera sensor data to a linear color space. ISP operations may include without limitation: demosaicing, color correction, white balance, and/or autoexposure. In one specific implementation, the GPU 804 performs in-device modifications to image data; GPU tasks may be parallelized and/or constrained by real-time budgets. GPU operations may include, without limitation: lens corrections (warping, stretching), image corrections (shading, blending), noise reduction (filtering, etc.). In one specific implementation, the CPU 806 controls device operation and/or performs tasks of arbitrary complexity/best-effort. CPU operations may include, without limitation: operating system (OS) functionality (power management, UX), memory management, etc. In one specific implementation, the hardware codec 808 converts image data to an encoded data for transfer and/or converts encoded data to image data for playback. Other processor subsystem implementations may multiply, combine, further subdivide, augment, and/or subsume the foregoing functionalities within these or other processing elements. For example, multiple ISPs may be used to service multiple camera sensors. Similarly, codec functionality may be subsumed with either GPU or CPU operation via software emulation.

In one embodiment, the sensor subsystem may sense the physical environment and capture and/or record the sensed data. In some embodiments, the sensor data may be further stored as a function of capture time (so-called "tracks"). Tracks may be synchronous (aligned) or asynchronous (non-aligned) to one another. The illustrated sensor subsystem includes: a camera sensor 810, a microphone 812, an accelerometer (ACCL 814), a gyroscope (GYRO 816), a magnetometer (MAGN 818). In the illustrated implementation, combinations of the sensed data can be used to derive translational and/or rotational movements; such derived data may include: camera orientation and/or image orientation quaternions (CORI/IORI 820) as well as gravity vectors (GRAV 822).

In one specific implementation, the camera sensor 810 senses light (luminance) via photoelectric sensors (e.g., CMOS sensors). A color filter array (CFA) value provides a color (chrominance) that is associated with each sensor. The combination of each luminance and chrominance value provides a mosaic of discrete red, green, blue value/positions, that may be "demosaiced" to recover a numeric tuple (RGB, CMYK, YCrCb, etc.) for each pixel of an image. In one exemplary embodiment, the camera sensor 810 may offer a larger dynamic range than the sensor's actual bit depth, by providing dual readout capability. Specifically, a plurality of exposures may be captured with a plurality of settings, and composited to achieve their combined dynamic range. Other techniques for increasing sensor bit depth may be substituted with equal success by artisans of ordinary skill in the related arts, given the contents of the present disclosure. In one specific implementation, the microphone 812 senses acoustic vibrations and converts the vibrations to an electrical signal (via a transducer, condenser, etc.). The electrical signal may be further transformed to frequency domain information. In one specific implementation, the accelerometer (ACCL 814) measures acceleration and gyroscope (GYRO 816) measure rotation in one or more dimensions. These measurements may be mathematically converted into a four-dimensional (4D) quaternion to describe the device motion, and electronic image stabilization (EIS) may be used to offset image orientation to counteract device motion (e.g., CORI/IORI 820). In one specific implementation, the magnetometer (MAGN 818) may provide a magnetic north vector (which may be used to "north lock" video and/or augment location services such as GPS), similarly the accelerometer (ACCL 814) may also be used to calculate a gravity vector (GRAV 822). Other sensor subsystem implementations may multiply, combine, further subdivide, augment, and/or subsume the foregoing functionalities within these or other processing elements. For example, two or more cameras may be used to capture panoramic (e.g., wide or) 360° or stereoscopic content. Similarly, two or more microphones may be used to record stereo sound.

In one embodiment, the user interface subsystem may be used to present media to, and/or receive input from, a human user. In some embodiments, media may include audible, visual, and/or haptic content. Examples include images, videos, sounds, and/or vibration. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen). In one exemplary embodiment, the user interface subsystem 824 may include an assortment of a touchscreen, physical buttons, and a microphone.

In one embodiment, the network/data interface subsystem may be used to receive data from, and/or transmit data to, other devices. In some embodiments, data may be received/transmitted as transitory signals (e.g., electrical signaling over a transmission medium). In other embodiments, data may be received/transmitted as non-transitory symbols (e.g., bits read from non-transitory computer-readable mediums). The network/data interface subsystem may include: wired interfaces, wireless interfaces, and/or removable memory media. In one exemplary embodiment, the network/data interface subsystem 826 may include network interfaces including, but not limited to: Wi-Fi, Bluetooth, Global Positioning System (GPS), USB, and/or Ethernet network interfaces. Additionally, the network/data interface subsystem 826 may include data interfaces such as: SD cards (and their derivatives) and/or any other optical/electrical/magnetic media (e.g., MMC cards, CDs, DVDs, tape, etc.).

In one embodiment, the memory subsystem may be used to store data locally at the source device 800. In one exemplary embodiment, data may be stored as non-transitory symbols (e.g., bits read from non-transitory computer-readable mediums). In one specific implementation, the memory subsystem 828 is physically realized as one or more physical memory chips (e.g., NAND/NOR flash) that are logically separated into memory data structures. The memory subsystem may be bifurcated into program code 830 and/or program data 832. In some variants, program code and/or program data may be further organized for dedicated and/or collaborative use. For example, the GPU and CPU may share a common memory buffer to facilitate large transfers of data therebetween. Similarly, the codec may have a dedicated memory buffer to avoid resource contention.

In one embodiment, the program code includes non-transitory instructions that when executed by the processor subsystem cause the processor subsystem to perform tasks which may include: calculations, and/or actuation of the sensor subsystem, user interface subsystem, and/or network/data interface subsystem. In some embodiments, the program code may be statically stored within the source device 800 as firmware. In other embodiments, the program code may be dynamically stored (and changeable) via software updates. In some such variants, software may be subsequently updated by external parties and/or the user, based on various access permissions and procedures.

In one embodiment, the tasks are configured to compress color space representations. In the illustrated embodiment, the tasks include: capturing raw images (e.g., via dual readout sensors), compositing the raw images to a linear color space, compressing the linear color space a log space representation, and encoding the log space representation for transfer. More broadly, various aspects of the present disclosure implement methods for compressing color space representations for use with a hardware pipeline. The compressed color space representation may be selected to preserve desirable signal codewords, despite limitations of the hardware pipeline.

In one embodiment, the sensor data is captured. In one exemplary embodiment, raw image data includes luminance data for each location of a color filter array (via the camera sensor 810). Image capture may include multiple image captures; for example, raw image data may include captures at different exposures (e.g., dual readout sensors). Other variants may use single capture or multiple captures that are arranged in time (video) and/or space (panorama).

While the foregoing discussion is presented in the context of raw image data, any sensor data that is captured by the sensor subsystem may be substituted with equal success. Notably, the raw image data is the camera sensor output and thus represents the original bit depth of captured data; in contrast, non-sensor formats that have been developed to a presentation color space are inherently a subset of the entire camera sensor's capability (e.g., presentation formats (REC. 709, REC. 2020, etc.). More broadly, the techniques described herein are broadly applicable to any sensor data associated with a bit depth, that is to be encoded as signal codewords.

In the illustrated embodiment, the sensor data may be directly sensed (e.g., raw image data and/or condenser/transducer waveforms); in other cases, the sensor data may be inferred from the sensor data. For example, audio and/or visual information may be used to calculate other environmental information (e.g., warp track and/or stereo information), similarly GRAV (the vector of gravity) may be calculated from accelerometer (ACCL 814) and/or gyroscope (GYRO 816) content. In other words, any signal data (sensed or inferred) that corresponds to the entire bit depth of the sensor may be encoded as signal codewords.

More broadly, any technique for obtaining sensor data from the physical environment may be substituted with equal success. Such techniques may include, receiving and/or retrieving sensor data. In some variants, a sensor may periodically push data to the processing subsystem (via interrupts and/or other random-access schemes). In other variants, the processing subsystem may actively pull data from the sensor subsystem (polling, etc.). Such embodiments may be particularly useful where multiple sensors are remotely distributed (e.g., surveillance cameras) and/or for certain types of operation (e.g., wake-on-trigger, low power modes, etc.).

In one embodiment, the sensor data is composited to linear color space. In one exemplary embodiment, the raw image data for multiple exposures are demosaiced and composited (scaled and summed) into a linear color space. The demosaicing process may include interpolating luminance and chrominance information for each pixel of an image, from the sensed luminance and color filter array (CFA) positioning. Image compositing combines image data from two or more exposures (usually by scaling and adding luminance/chrominance values); more generally however, any technique for combining sensor data may be substituted with equal success. In some variants, combining image exposures may additionally entail warping, stretching, stitching, motion compensation, and other image processing techniques.

As used herein, the term "linear" refers to data that preserves the arithmetic properties of addition and scalability across a range. For example, when incident light on a photosite is doubled, the number of photoelectrons doubles, and their corresponding luminance values double. In contrast, "non-linear" refers to data that disproportionately scales across a range; a log space represents changes in luminance/chrominance logarithmically. As another example, a piecewise color space (such as Hybrid Log Gamma (HLG)) represents luminance/chrominance at different scales across different ranges.

While the illustrated embodiment converts sensor data to image data via a demosaic process, the principles described herein broadly encompass any technique for encoding sensor data to signal codewords. For example, condenser or transducer waveforms may be converted to audio samples. Similarly, accelerometer (ACCL 814) and/or gyroscope (GYRO 816) measurements may be converted to accelerations and/or rotations.

As a brief aside, sensor data is discrete measurements of the physical environment; as such, sensor data may have gaps in time and/or space. For example, raw image data associates a luminance value with only one of red, green, or blue; this information is converted to a numeric tuple (RGB, CMYK, YCrCb, etc.). Other examples may include converting discrete time domain electrical signals to continuous frequency domain waveforms (e.g., audio samples), and/or converting acceleration and/or rotation measurements to quaternions, etc. Any number of transforms and/or mappings may be used to represent temporally/spatially continuous data within discrete data samples.

In one embodiment, the linear color space is compressed to log space based on hardware bit depth parameters. The compression process may include mapping one or more linear color space values to one or more log space values. For example, each primary of the 2048 linear color space may be mapped to a 103 log space primary (see e.g., Stop 0 of FIG. 4, described above). In other words, the linear to log mapping is channel independent, e.g., the red, green and blue primaries are separately mapped. The N-to-M mappings may include one-to-many, many-to-one, and/or many-to-many mappings. In one exemplary embodiment, the conversion may be performed using a look-up table (LUT). In other embodiments, the conversion may be performed arithmetically (e.g., using quantization and/or rounding).

In one exemplary embodiment, the log compression may be selected for encode bit depth parameters of a hardware codec 808 of the source device. In other variants, the log compression may be selected for any hardware bit depth limitation between the source and sink device. For example, the codec may have a wider bit depth (10-bit) than either a network codec (8-bit) or a legacy sink codec (8-bit); in such cases, the bit depth of the least capable codec may be used.

As used herein, the term "bit depth" refers to the number of unique quantization levels that are available within a binary symbol. Thus, for example, an N-bit symbol corresponds to 2N unique values (e.g., an 8-bit codeword supports up to 256 unique values, a 10-bit codeword supports up to 1024 unique values, etc.). While the foregoing examples are presented in the context of fixed bit width gray codes, artisans of ordinary skill will readily appreciate that the techniques described herein may be broadly extended to, and or used in conjunction with, variable bit width encodings (e.g., Huffman and/or Shannon encodings) and/or one-hot encodings.

While the foregoing discussion is presented in the context of log compression, a variety of other compression algorithms may be substituted with equal success. Other compression algorithms may include e.g., piecewise, gamma, and/or other log bases. For example, a gamma or piecewise look-up-table based conversion may be substituted so long as the resulting numeric tuples fit within the acceptable ranges of the hardware codec 808 (or other hardware limitation). In other words, so long as the source and the sink device have the same compression/decompression framework (linear-to-log, linear-to-gamma, linear-to-piecewise, and vice versa), etc.

In one embodiment, the log color space may be encoded for transfer off-device via the hardware codec 808. As previously discussed, the hardware codec 808 does not distinguish between log space and other color spaces; thus, codec operation is unaffected by the aforementioned steps. In some variants, the encoded file may be an MPEG-based file according to e.g., High Efficiency Video Coding (HEVC) codecs (H.265), and/or Advanced Video Coding (AVC) codecs (H.264); other codec types may be substituted with equal success. In some embodiments, the encoded file may additionally include metadata that identifies the encoded file as compressed data (rather than a presentation media file that is ready for viewing). In some variants, a compression key may be included (e.g., the look-up-table mapping of linear color space to log space).

As a brief aside, transfer encoding may take a variety of different forms and/or protocols. For example, MPEG-4 media content may be subdivided and additionally encapsulated according to an MPEG-2 transport format to enable live streaming delivery. In other cases, MPEG-4 media content may be encoded into a single monolithic file (for bulk data transfer). More directly, any number of delivery techniques may be substituted with equal success. While the foregoing discussion is presented in the context of source device driven transfer, other schemes may responsively serve content (e.g., where the source device responds to requests from another device). For example, a live streaming embodiment may allow a source device to service requests on a first-come-first-serve basis from other devices.

While the foregoing discussion is presented in the context of off-device transfer, the techniques may be modified for any number of on-device hardware limitations. Alternative implementations may select log compression that is specific to storage, processing complexity, and/or performance on-device. For example, a storage network may select different log compressions depending on whether the content is stored in long term archival (e.g., aggressive compression may be preferred) or for cached delivery (e.g., frequent usage may offset compression benefits). In another such example, on-device compression may be selected for processing considerations e.g., certain processors may be optimized for 8-bit, 16-bit words, 32-bit, etc.

Figure 9:
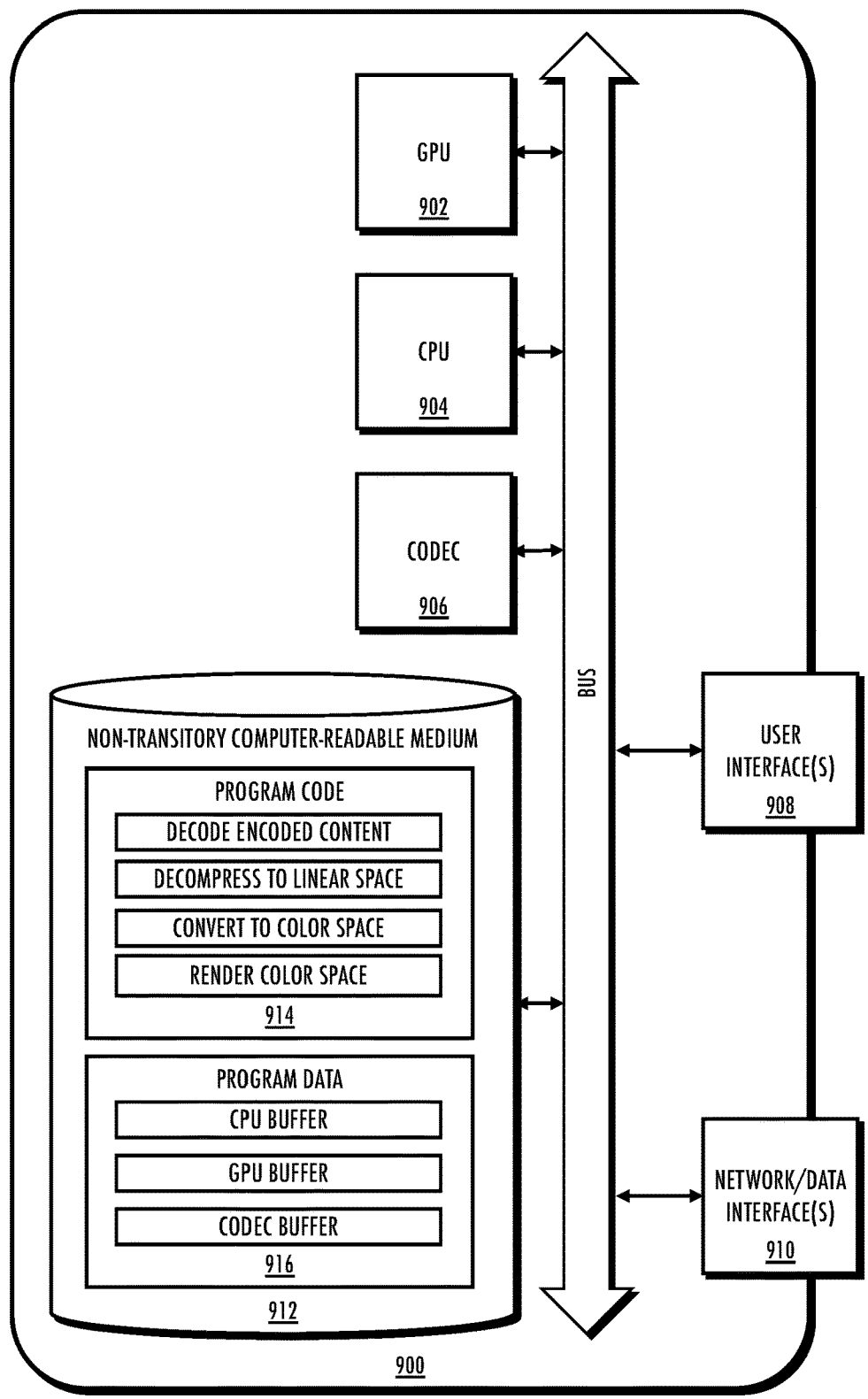
FIG. 9 is a logical block diagram of one exemplary sink device, in accordance with various aspects of the present disclosure.

Referring now to FIG. 9, a logical block diagram of a sink device 900 useful in conjunction with various aspects of the present disclosure is presented. The sink device 900 includes a processor subsystem, a memory subsystem, a user interface subsystem, a network/data interface subsystem, and a bus to connect them. During exemplary operation, encoded content is obtained (e.g., from a source device 800), decoded to log compressed space, decompressed to linear color space for in-device processing, converted to a presentation color space, and presented to the user via the user interface subsystem. In one exemplary embodiment, the sink device 900 may be a smart phone that plays audio and/or video footage. Other embodiments of source devices may include without limitation: an action camera, a tablet, a laptop, a television, a workstation, and/or any other sink of data.

In one embodiment, the processor subsystem may read instructions from the memory subsystem and execute them within one or more processors. The illustrated processor subsystem includes: a graphics processing unit (GPU 902), a central processing unit (CPU 904), and a codec 906. Other processor subsystem implementations may multiply, combine, further subdivide, augment, and/or subsume the foregoing functionalities within these or other processing elements. For example, multiple GPUs may be used to perform high complexity image operations in parallel. Similarly, codec functionality may be subsumed with either GPU or CPU operation via software emulation.

In one embodiment, the user interface subsystem may be used to present media to, and/or receive input from, a human user. The user interface subsystem may include physical components (e.g., buttons, keyboards, switches, scroll wheels, etc.) or virtualized components (via a touchscreen). In one exemplary embodiment, the user interface subsystem 908 may include an assortment of a display, touchscreen, physical buttons, speaker(s), and a microphone.

In one embodiment, the network/data interface subsystem may be used to receive data from, and/or transmit data to, other devices. The network/data interface subsystem may include: wired interfaces, wireless interfaces, and/or removable memory media. In one exemplary embodiment, the network/data interface subsystem 910 may include network interfaces including, but not limited to: Wi-Fi, Bluetooth, Global Positioning System (GPS), USB, and/or Ethernet network interfaces. Additionally, the network/data interface subsystem 826 may include data interfaces such as: SD cards (and their derivatives) and/or any other optical/electrical/magnetic media (e.g., MMC cards, CDs, DVDs, tape, etc.).

In one embodiment, the memory subsystem may be used to store data locally at the sink device 900. In one exemplary embodiment, data may be stored as non-transitory symbols (e.g., bits read from non-transitory computer-readable mediums). In one specific implementation, the memory subsystem 912 is physically realized as one or more physical memory chips (e.g., NAND/NOR flash) that are logically separated into memory data structures. The memory subsystem may be bifurcated into program code 914 and/or program data 916. In some variants, program code and/or program data may be further organized for dedicated and/or collaborative use. For example, a multicore GPU and/or CPU system may allocate dedicated memory buffers to facilitate parallelized operation. Similarly, the codec may have a dedicated memory buffer to avoid resource contention.

In one embodiment, the program code includes non-transitory instructions that when executed by the processor subsystem cause the processor subsystem to perform tasks which may include: calculations, and/or actuation of the user interface subsystem and/or network/data interface subsystem. In some embodiments, the program code may be statically stored within the sink device 900 as firmware. In other embodiments, the program code may be dynamically stored (and changeable) via software updates. In some such variants, software may be subsequently updated by external parties and/or the user, based on various access permissions and procedures.

In one embodiment, the tasks are configured to decompress color space representations. In the illustrated embodiment, the tasks include: decoding encoded content into log space, decompressing the log space to a linear color space representation, converting the linear color space to a presentation color space, and rendering the presentation color space. More broadly, various aspects of the present disclosure implement methods for decompressing color space representations obtained via a hardware limited pipeline.

In one embodiment, the encoded content is decoded into log color space and decompressed to a linear color space. As previously noted, the sink device 900 may use the complementary compression/decompression framework to the source device 800. Thus, for example, if the encoded content is a log compressed MPEG-based file according to e.g., High Efficiency Video Coding (HEVC) codec (H.265), then complementary techniques are used to decode and decompress. In one such implementation, decompression and/or decoding information may be provided in the form of metadata. For example, a metadata tag may identify the compression type and/or key. In other implementations, decompression and/or decoding information may be inferred based on source device identifiers (version and revision of software, etc.).

In one embodiment, log compressed image data with a known log base may be decompressed back to linear color space. In one exemplary embodiment, the decompression process may include reversing the compression based on a look-up-table. For example, 103 log color space primaries (see e.g., Stop 0 of FIG. 4, described above) may be mapped back to 103 linear color space primaries that span a range of 2048 quantization values.

In one exemplary embodiment, the linear color space is converted to a presentation color space that is suitable for viewing (e.g., REC. 709, REC. 2020, etc.). As previously noted, the presentation color space may be selected based on the supported color spaces of the sink device (e.g., a display screen may support REC. 2020, REC. 709, etc.).

In one exemplary embodiment, the presentation color space may be selected based on display considerations. In some cases, the presentation color space may be selected to emphasize a certain range of exposure. For example, an action camera with a small display may be used in bright ambient light; under such conditions where even large differences in color space are imperceptible. As a result, the action camera may use only a small number of stops (7-stops) for display to the user; the reduced color space may have sufficient detail for the user's most common usage (e.g., checking shot placement). In contrast, studio production displays may handle much higher capabilities; for example, a user may do editing at 14-stops to find the ideal exposure (e.g., digging into shadows and/or dimming highlights).

In some cases, display capabilities may be dynamically evaluated. For instance, a smart phone may dynamically determine a suitable number of stops, based on an ambient light sensor and/or the user's display preferences. More broadly, any number of sink device considerations may be used to dynamically adjust presentation color space. For example, a sink device may reduce the presentation color space to e.g., reduce power consumption, memory usage, and/or processor bandwidth. Similarly, a sink device may increase the presentation color space to e.g., improve image quality and/or focus on the exposure extremes.

In one embodiment, the presentation color space is rendered and/or displayed. In one exemplary embodiment, the presentation color space is displayed via a display of the user interface subsystem 908. In some such implementations, the presentation color space may be further post-processed via subsequent artistic modifications by the user (e.g., filtering software).

In other embodiment, the presentation color space may be provided to another machine via the network/data interface subsystem 910. In some such implementations, the presentation color space may be interpreted by a machine for e.g., police/security/military applications, industrial automation, artificial intelligence/machine learning, fleet management, self-driving applications, and/or any other computer vision applications.

Technological Improvements and Other Considerations

Currently, images (and video) may be stored and transported either as raw image data or developed color space formats. Post-processing applications use raw image data to give users the most flexibility during editing. Existing developed color space formats allow for transport via commodity codecs but irreversibly quantize light information into fixed ranges and colors which greatly limits subsequent flexibility. In one specific aspect, the log compression scheme is specifically selected based on limitations of the source device (e.g., sensor readout bit depth and embedded computation limitations), the hardware pipeline (e.g., encode bit depth of codecs), etc. In this manner, the transport color space balances signal-to-noise relationships for post-processing flexibility while also fitting within the commodity codec pipeline. More directly, the various solutions described herein are not abstract since they are tied to specific machines capabilities and limitations.

Furthermore, the above-described system and method solves a technological problem in industry practice related to preserving desirable signal and noise relationships where the presentation color space is unknown, or where color correction is expected. In order to "develop" raw image data to a presentation color space for display, a device must assume (or receive input) that defines an exposure, white balance, and/or color correction. Developing to presentation color spaces is inherently lossy since the human visual system behaves differently under different lighting conditions. In contrast, various embodiments of the present disclosure, develop to raw image data to a transport color space that preserves desirable signal-to-noise relationships. Specifically, the devices develop image data to linear color space which does not make any irreversible adjustments for exposure, white balance, and/or color correction. The linear color space is compressed to fit within hardware pipeline (limited bit depths) using log compression. Log compression preserves signal codewords through the hardware pipeline. Thereafter, any sink device can recover a linear color space, to e.g., perform post-processing and/or generate a presentation color space. Since the irreversible adjustments are performed after the hardware pipeline, signal is largely preserved, and noise can be significantly reduced. The various solutions described herein improve computer functionality by increasing data transfer fidelity.

Additionally, the above-described system and method solves a technological problem in industry practice related to color space flexibility. Existing source devices encode image data into presentation color spaces that are ready for viewing "as-is". Unfortunately, once encoded, the image data cannot be improved (and may be degraded). For example, an image that is encoded as REC. 709 could be reformatted as REC. 2020, but the color palette would remain REC. 709. Subsequent edits may improve the aesthetic appeal (but only further degrade the originally captured image). This is particularly problematic for ecosystems that may capture fleeting/ephemeral footage, target unknown color spaces, and/or provide the user flexibility to perform arbitrary color corrections. In one specific aspect, sink devices can obtain image data in a transport color space. This allows the sink device to flexibly adjust the color space based on its local application considerations. The various solutions described herein improve computer functionality by enabling any device to operate at its highest supported color space, regardless of intervening processes.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A source device configured to compress color space representations for a hardware pipeline, comprising:
   a sensor subsystem comprising a dual readout camera sensor;
   a user interface subsystem;
   a data interface subsystem;
   a processor subsystem; and
   a memory subsystem comprising a non-transitory computer-readable medium that comprises one or more instructions that when executed by the processor subsystem, causes the processor subsystem to:
   capture sensor data comprising a first exposure and a second exposure via the dual readout camera sensor;
   convert the first exposure of the sensor data to first numeric tuples of a linear color space and the second exposure of the sensor data to second numeric tuples of the linear color space, the linear color space characterized by preservation of arithmetic properties of addition and scalability of the first numeric tuples and the second numeric tuples;
   composite the first numeric tuples and the second numeric tuples to composited numeric tuples;
   compress the composited numeric tuples to a transport color space based on at least one hardware parameter, the transport color space comprising a log-based color space different from the linear color space; and
   encode the composited numeric tuples for transfer to a sink device.

2. The source device of claim 1, where the processor subsystem comprises a codec; and
where the at least one hardware parameter comprises an encode bit depth of the codec.

3. The source device of claim 1,
where the at least one hardware parameter comprises a readout bit depth of the dual readout camera sensor.

4. The source device of claim 3,
where the at least one hardware parameter comprises a difference between the first exposure and the second exposure.

5. The source device of claim 1, where the user interface subsystem comprises a display; and
where the one or more instructions, when executed by the processor subsystem, further causes the processor subsystem to:
convert the composited numeric tuples from the transport color space to a presentation color space that does not preserve exposure, white balance, or color correction of the sensor data; and
render an image based on the presentation color space.

6. The source device of claim 5, where the presentation color space is characterized by a first number of stops of dynamic range; and
where the transport color space is characterized by a second number of stops of dynamic range different than the first number of stops.

7. The source device of claim 1, where the data interface subsystem is configured to communicate with an intermediary network; and
where the one or more instructions, when executed by the processor subsystem, further causes the processor subsystem to compress the composited numeric tuples to the transport color space based on at least one network parameter of the intermediary network.

* * * * *